United States Patent
Foret

(10) Patent No.: US 9,560,731 B2
(45) Date of Patent: *Jan. 31, 2017

(54) SYSTEM, METHOD AND APPARATUS FOR AN INDUCTIVELY COUPLED PLASMA ARC WHIRL FILTER PRESS

(71) Applicant: Foret Plasma Labs, LLC, The Woodlands, TX (US)

(72) Inventor: Todd Foret, The Woodlands, TX (US)

(73) Assignee: Foret Plasma Labs, LLC, The Woodlands, TX (US)

(*) Notice: Subject to any disclaimer, the term of this patent is extended or adjusted under 35 U.S.C. 154(b) by 276 days.

This patent is subject to a terminal disclaimer.

(21) Appl. No.: 14/217,018

(22) Filed: Mar. 17, 2014

(65) Prior Publication Data

US 2014/0209573 A1    Jul. 31, 2014

Related U.S. Application Data

(63) Continuation-in-part of application No. 13/633,128, filed on Oct. 1, 2012, now Pat. No. 8,810,122, which is
(Continued)

(30) Foreign Application Priority Data

Oct. 1, 2013  (WO) ................ PCT/US2013/062941

(51) Int. Cl.
*H01J 17/26*  (2012.01)
*H05H 1/26*   (2006.01)
(Continued)

(52) U.S. Cl.
CPC ................ *H05H 1/26* (2013.01); *H05H 1/50* (2013.01); *H05H 2001/3431* (2013.01); *H05H 2001/466* (2013.01); *H05H 2001/4667* (2013.01)

(58) Field of Classification Search
CPC .... H05H 1/34; H05H 2001/3431; B23K 10/00
(Continued)

(56) References Cited

U.S. PATENT DOCUMENTS 481,979 A   9/1892  Stanley
501,732 A   7/1893  Roeske
(Continued)

FOREIGN PATENT DOCUMENTS

CN    101905196 A    12/2010
CN    202224255 U     5/2012
(Continued)

OTHER PUBLICATIONS

Belani, A., "It's Time for an Industry Initiative on Heavy Oil," JPT Online accessed on Oct. 16, 2007 at http://www.spe.org/spe-app/spe/jpt/2006/06/mangement_heavy_oil.htm.
(Continued)

*Primary Examiner* — Vip Patel
(74) *Attorney, Agent, or Firm* — Daniel J. Chalker; Edwin S. Flores; Chalker Flores, LLP

(57) ABSTRACT

A plasma treatment system includes a plasma arc torch, a tee attached to a hollow electrode nozzle of the plasma arc torch, and a screw feed unit or a ram feed unit having an inlet and an outlet attached to the tee. The plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel,
(Continued)

Inductively Coupled Plasma ArcWhirl® and a hollow electrode nozzle connected to the second end of the cylindrical vessel such that a centerline of the hollow electrode nozzle is aligned with the longitudinal axis of the cylindrical vessel.

15 Claims, 25 Drawing Sheets

Related U.S. Application Data a continuation-in-part of application No. 12/371,575, filed on Feb. 13, 2009, now Pat. No. 8,278,810, which is a continuation-in-part of application No. 12/288,170, filed on Oct. 16, 2008, now Pat. No. 9,051,820, said application No. 12/371,575 is a continuation-in-part of application No. 12/370,591, filed on Feb. 12, 2009, now Pat. No. 8,074,439.

(60) Provisional application No. 61/788,404, filed on Mar. 15, 2013, provisional application No. 60/980,443, filed on Oct. 16, 2007, provisional application No. 61/027,879, filed on Feb. 12, 2008, provisional application No. 61/028,386, filed on Feb. 13, 2008.

(51) Int. Cl.
  *H05H 1/50* (2006.01)
  *H05H 1/34* (2006.01)
  *H05H 1/46* (2006.01)

(58) Field of Classification Search
  USPC .................................. 313/231.41, 231.31
  See application file for complete search history.

(56) References Cited

U.S. PATENT DOCUMENTS

| | | |
|---|---|---|
| 2,784,294 A | 3/1957 | Gravert |
| 2,898,441 A | 8/1959 | Reed et al. |
| 2,923,809 A | 2/1960 | Clews et al. |
| 3,004,189 A | 10/1961 | Giannini |
| 3,082,314 A | 3/1963 | Arata et al. |
| 3,131,288 A | 4/1964 | Browning et al. |
| 3,242,305 A | 3/1966 | Kane et al. |
| 3,522,846 A | 8/1970 | New |
| 3,534,388 A | 10/1970 | Ito et al. |
| 3,567,898 A | 3/1971 | Fein |
| 3,619,549 A | 11/1971 | Hogan et al. |
| 3,641,308 A | 2/1972 | Couch, Jr. et al. |
| 3,787,247 A | 1/1974 | Couch, Jr. |
| 3,798,784 A | 3/1974 | Kovats et al. |
| 3,830,428 A | 8/1974 | Dyos |
| 3,833,787 A | 9/1974 | Couch, Jr. |
| 4,067,390 A | 1/1978 | Camacho et al. |
| 4,169,503 A | 10/1979 | Scott |
| 4,203,022 A | 5/1980 | Couch, Jr. et al. |
| 4,265,747 A | 5/1981 | Copa et al. |
| 4,311,897 A | 1/1982 | Yerushalmy |
| 4,344,839 A | 8/1982 | Pachkowski et al. |
| 4,463,245 A | 7/1984 | McNeil |
| 4,531,043 A | 7/1985 | Zverina et al. |
| 4,567,346 A | 1/1986 | Marhic |
| 4,624,765 A | 11/1986 | Cerkanowicz et al. |
| 4,685,963 A | 8/1987 | Saville et al. |
| 4,776,638 A | 10/1988 | Hahn |
| 4,791,268 A | 12/1988 | Sanders et al. |
| 4,886,118 A | 12/1989 | Van Meurs et al. |
| 5,019,268 A | 5/1991 | Rogalla |
| 5,048,404 A | 9/1991 | Bushnell et al. |
| 5,082,054 A | 1/1992 | Kiamanesh |
| 5,132,512 A | 7/1992 | Sanders et al. |
| 5,166,950 A | 11/1992 | Jouvaud et al. |
| 5,326,530 A | 7/1994 | Bridges |
| 5,348,629 A | 9/1994 | Khudenko |
| 5,368,724 A | 11/1994 | Ayers et al. |
| 5,534,232 A | 7/1996 | Denes et al. |
| 5,609,736 A | 3/1997 | Yamamoto |
| 5,609,777 A | 3/1997 | Apunevich et al. |
| 5,655,210 A | 8/1997 | Gregoire et al. |
| 5,660,743 A | 8/1997 | Nemchinsky |
| 5,738,170 A | 4/1998 | Lavernhe |
| 5,746,984 A | 5/1998 | Hoard |
| 5,760,363 A | 6/1998 | Hackett et al. |
| 5,766,447 A | 6/1998 | Creijghton |
| 5,876,663 A | 3/1999 | Laroussi |
| 5,879,555 A | 3/1999 | Khudenko |
| 5,893,979 A | 4/1999 | Held |
| 5,908,539 A | 6/1999 | Young et al. |
| 5,979,551 A | 11/1999 | Uban et al. |
| 6,007,681 A | 12/1999 | Kawamura et al. |
| 6,117,401 A | 9/2000 | Juvan |
| 6,228,266 B1 | 5/2001 | Shim |
| 6,514,469 B1 | 2/2003 | Kado et al. |
| 6,749,759 B2 | 6/2004 | Denes et al. |
| 6,929,067 B2 | 8/2005 | Vinegar et al. |
| 6,942,786 B1 | 9/2005 | Fosseng |
| 6,987,792 B2 | 1/2006 | Do et al. |
| 7,081,171 B1 | 7/2006 | Sabol et al. |
| 7,086,468 B2 | 8/2006 | De Rouffignac et al. |
| 7,096,953 B2 | 8/2006 | De Rouffignac et al. |
| 7,121,342 B2 | 10/2006 | Vinegar et al. |
| 7,128,816 B2 | 10/2006 | Denes et al. |
| 7,422,695 B2 | 9/2008 | Foret |
| 7,536,975 B2 | 5/2009 | Denes et al. |
| 7,857,972 B2 | 12/2010 | Foret |
| 7,893,408 B2 | 2/2011 | Hieftje et al. |
| 8,074,439 B2 | 12/2011 | Foret |
| 8,278,810 B2 | 10/2012 | Foret |
| 8,568,663 B2 | 10/2013 | Foret |
| 8,810,122 B2 | 8/2014 | Foret |
| 8,833,054 B2 | 9/2014 | Foret |
| 8,904,749 B2 | 12/2014 | Foret |
| 9,051,820 B2 | 6/2015 | Foret |
| 2002/0148562 A1 | 10/2002 | Aoyagi et al. |
| 2003/0024806 A1 | 2/2003 | Foret |
| 2003/0101936 A1 | 6/2003 | Lee |
| 2003/0150325 A1 | 8/2003 | Hyppanen |
| 2003/0179536 A1 | 9/2003 | Stevenson et al. |
| 2003/0213604 A1 | 11/2003 | Stevenson et al. |
| 2005/0087435 A1 | 4/2005 | Kong et al. |
| 2005/0151455 A1 | 7/2005 | Sato et al. |
| 2005/0155373 A1 | 7/2005 | Hirooka et al. |
| 2006/0104849 A1 | 5/2006 | Tada et al. |
| 2006/0151445 A1 | 7/2006 | Schneider |
| 2006/0196424 A1 | 9/2006 | Swallow et al. |
| 2007/0104610 A1 | 5/2007 | Houston et al. |
| 2007/0196249 A1 | 8/2007 | Fridman et al. |
| 2007/0240975 A1 | 10/2007 | Foret |
| 2007/0253874 A1 | 11/2007 | Foret |
| 2008/0058228 A1 | 3/2008 | Wilson |
| 2008/0202915 A1 | 8/2008 | Hieftje et al. |
| 2009/0118145 A1 | 5/2009 | Wilson et al. |
| 2009/0200032 A1 | 8/2009 | Foret |
| 2009/0235637 A1 | 9/2009 | Foret |
| 2009/0277774 A1 | 11/2009 | Foret |
| 2010/0212498 A1 | 8/2010 | Salazar |
| 2010/0258429 A1 | 10/2010 | Ugolin |
| 2011/0005999 A1 | 1/2011 | Randal |
| 2011/0022043 A1 | 1/2011 | Wandke et al. |
| 2011/0031224 A1 | 2/2011 | Severance, Jr. et al. |
| 2011/0223091 A1 | 9/2011 | Miller et al. |
| 2011/0225948 A1 | 9/2011 | Valeev et al. |
| 2011/0303532 A1 | 12/2011 | Foret |
| 2012/0097648 A1 | 4/2012 | Foret |
| 2012/0205293 A1 | 8/2012 | Thanoo et al. |
| 2012/0227968 A1 | 9/2012 | Eldred et al. |
| 2013/0020926 A1 | 1/2013 | Foret |

FOREIGN PATENT DOCUMENTS

| | | |
|---|---|---|
| EP | 1707096 A2 | 10/2006 |
| EP | 1915940 A1 | 4/2008 |

(56) References Cited

FOREIGN PATENT DOCUMENTS

| | | |
|---|---|---|
| GB | 1224638 A | 3/1971 |
| JP | 2006-501980 A | 1/2006 |
| JP | 2008238053 A | 10/2008 |
| KR | 101999009569 A | 2/1999 |
| KR | 10-2004-0005107 A | 1/2004 |
| WO | 2007117634 A2 | 10/2007 |

OTHER PUBLICATIONS

"Brandt, A. R., ""Converting Green River oil shale to liquid fuels with Alberta Taciuk Processor: energy inputs andgreenhouse gas emissions,"" Jun. 1, 2007".

Brandt, A. R., "Converting Green River oil shale to liquid fuels with the Shell in-situ conversion process: energy inputs and greenhouse gas emissions," Jun. 30, 2007.

Kavan, L., "Electrochemical Carbon," Chem Rev (1997), 97:3061-3082.

Understanding in-situ combustion, www.HeavyOilinfo.com, accessed Oct. 16, 2007.

Unleashing the potential: Heavy Oil, Supplement to E&P Annual Reference Guide, www.eandp.info.com, Jun. 2007.

International Search Report [KIPO] PCT/US201/062941 dated Jan. 27, 2014.

International Search Report and Written Opinion for PCT/US2008/011926 dated Apr. 27, 2009.

International Search Report and Written Opinion for PCT/US2009/000937 dated Sep. 17, 2009.

PCT/US2014/2014/024991 [KIPO] International Search Report dated Aug. 6, 2014.

PCT/US2014/030090 [KIPO] International Search Report dated Sep. 25, 2014.

Extended European Search Report [EP 13862561.1] dated Jul. 7, 2016.

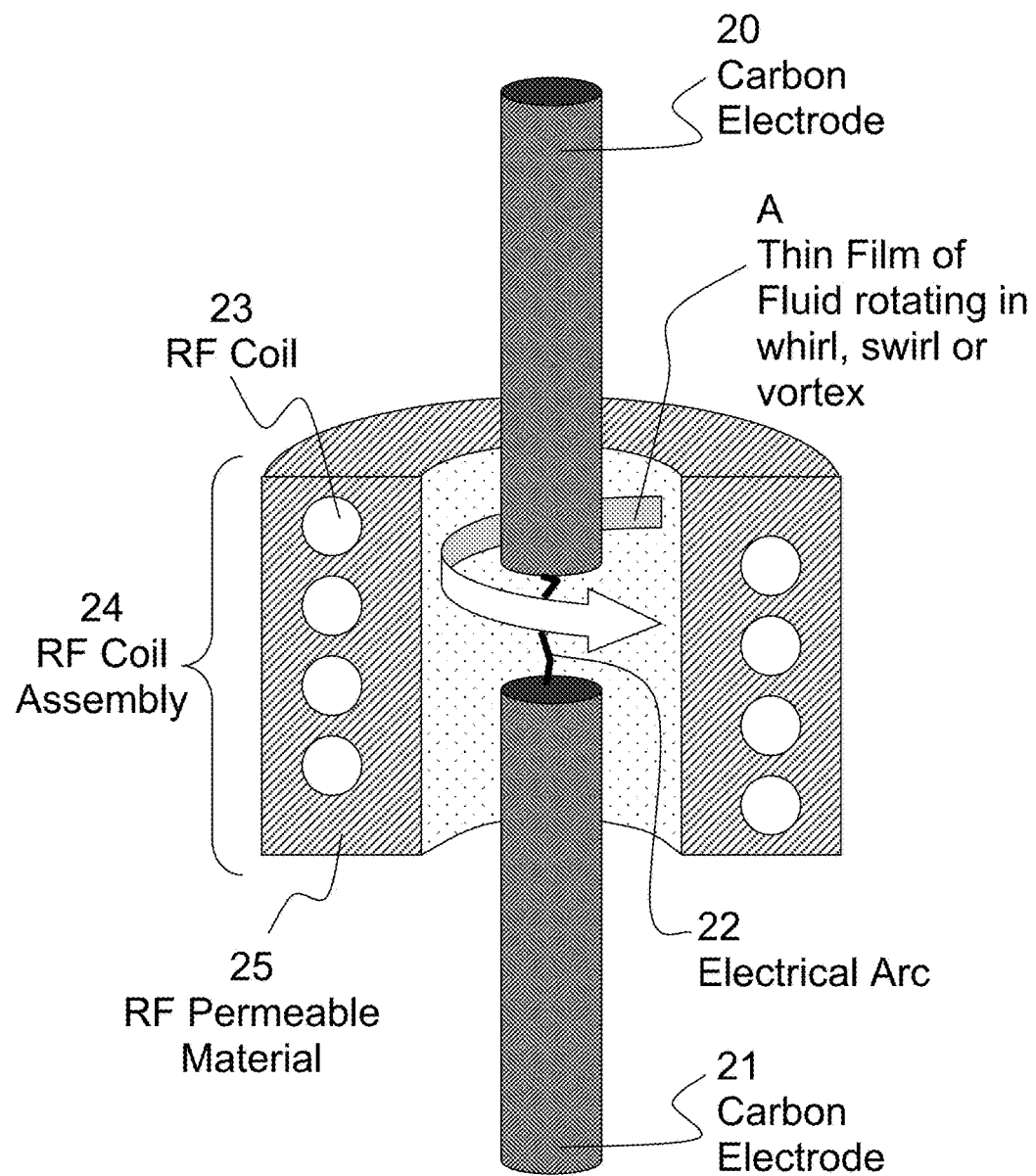
FIG. 1 – Inductively Coupled Plasma ArcWhirl®

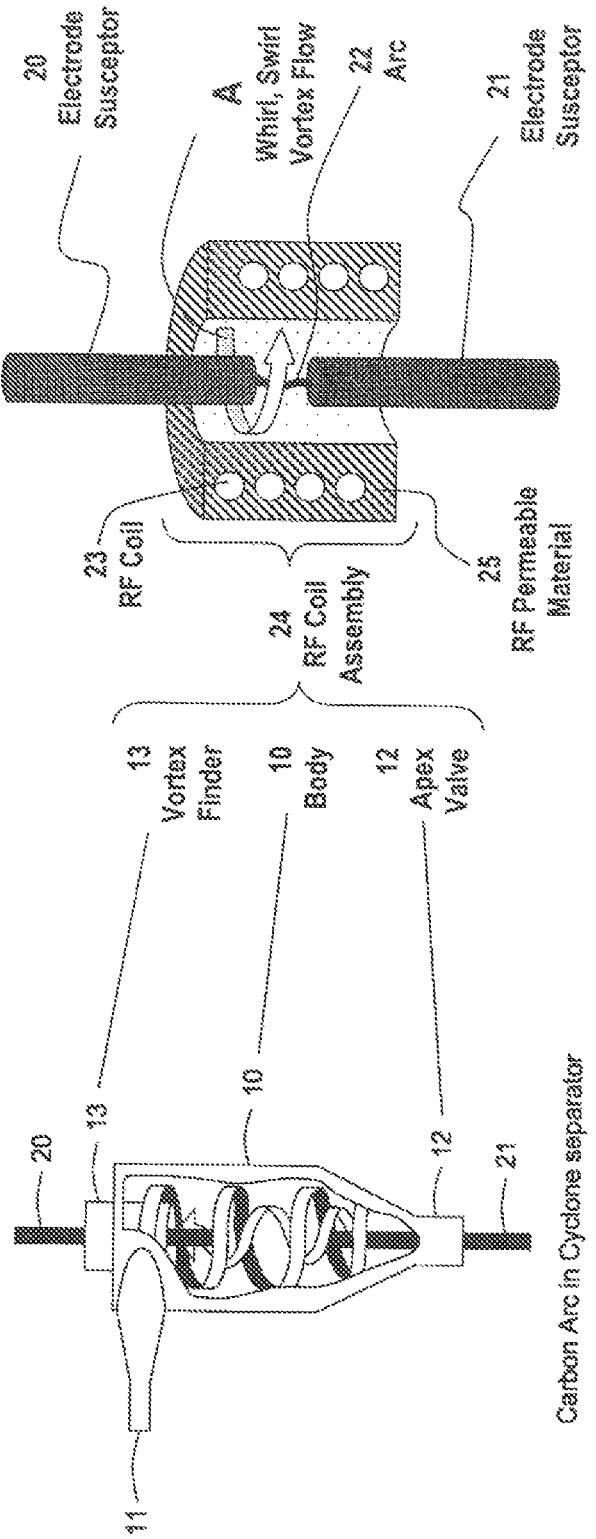

FIG. 3 – Original ArcWhirl® Prototype Modified with Electrode Vortex Finder
FIG. 3A – Original ArcWhirl®
FIG. 3B – Arc Whirl® with Vortex Finder Electrode
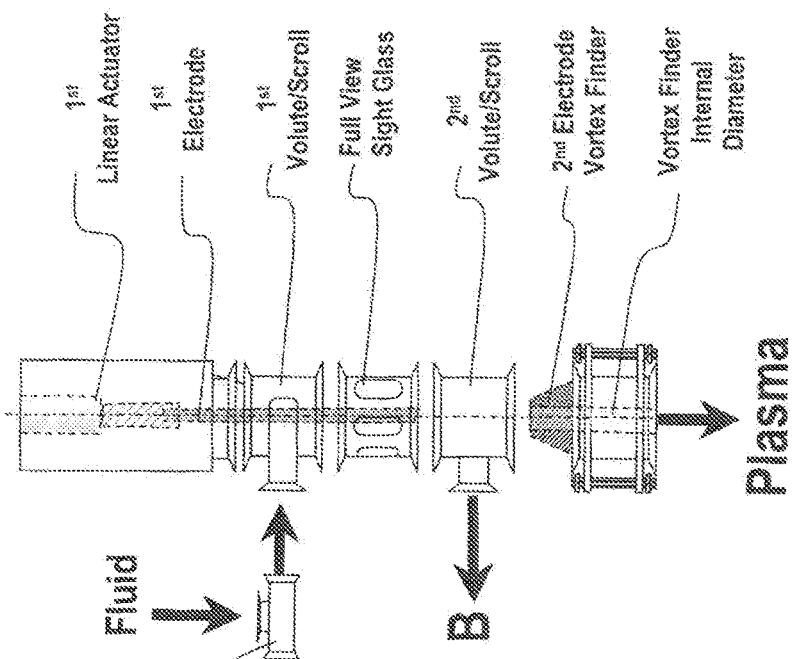
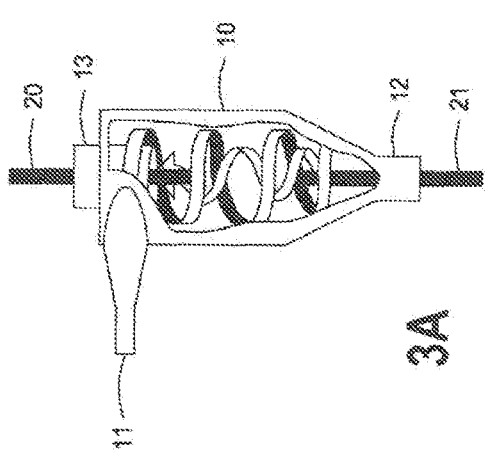

FIG. 4 – IC Plasma ArcWhirl® Vortex Finder Electrode Susceptor & RF Coil

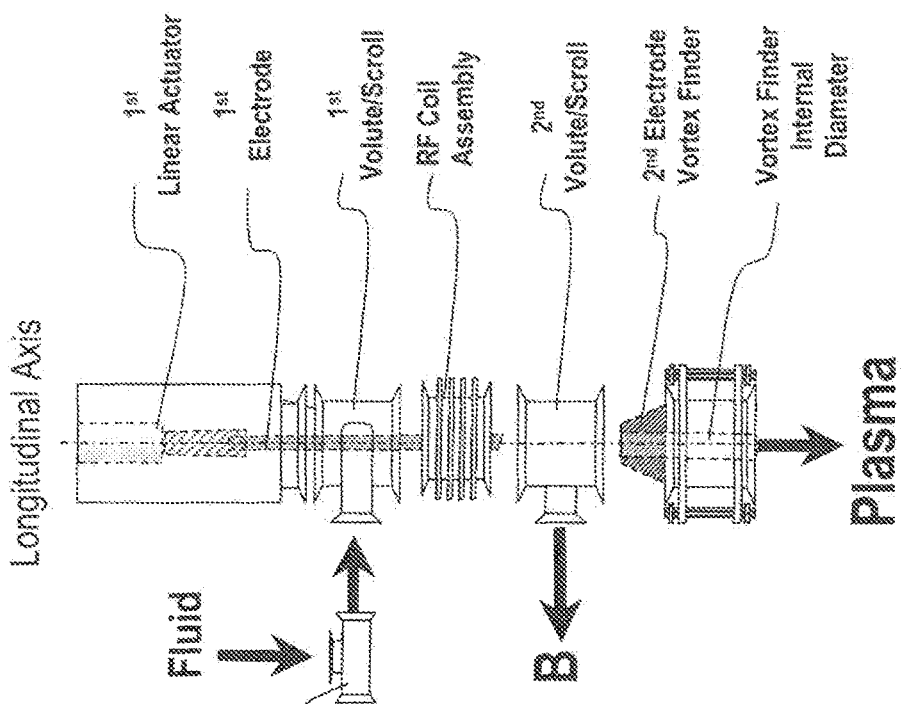

FIG. 4B – ICP Arc Whirl®
Longitudinal Axis

- 1st Linear Actuator
- 1st Electrode
- 1st Volute/Scroll
- RF Coil Assembly
- 2nd Volute/Scroll
- 2nd Electrode Vortex Finder
- Vortex Finder Internal Diameter Venturi Eductor or Ejector — Fluid Plasma

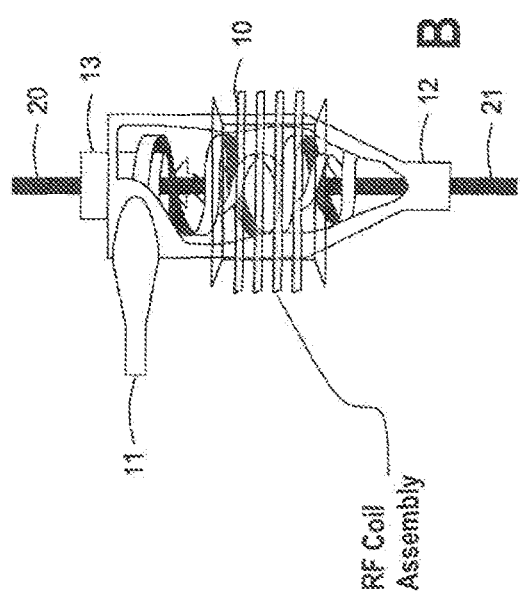

FIG. 4A – ICP Arc Whirl®

RF Coil Assembly

Carbon Arc in Cyclone separator

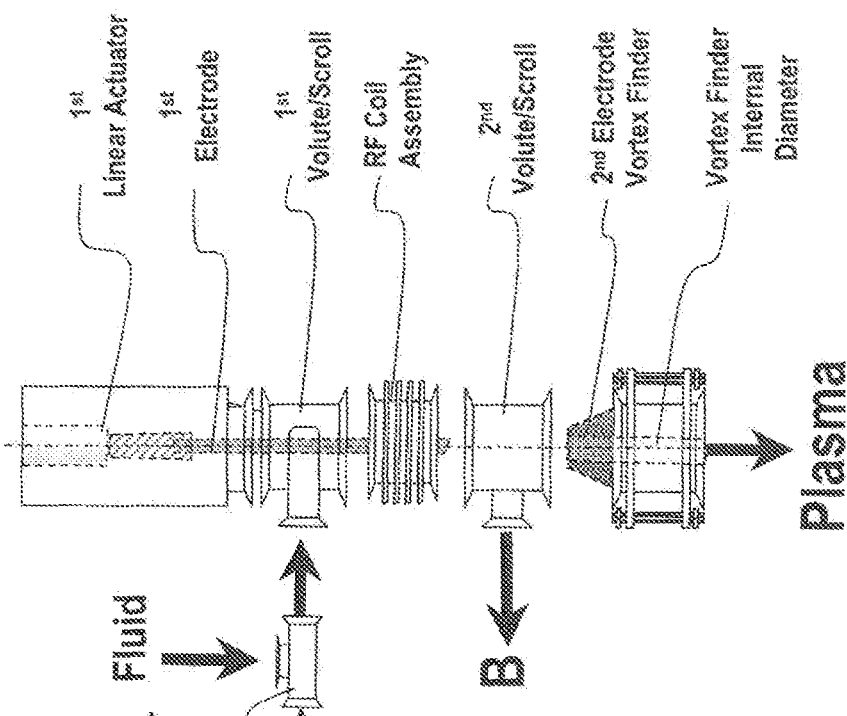
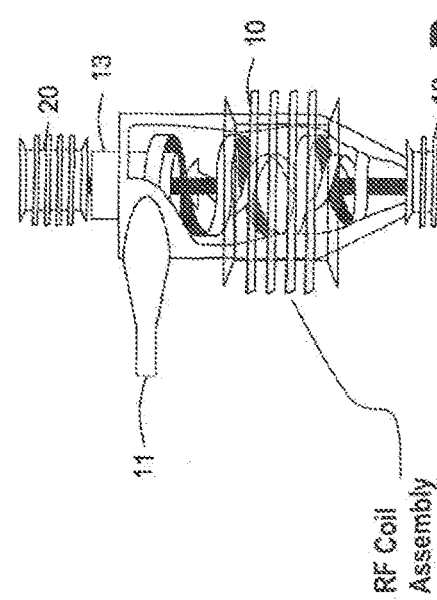
FIG. 5 – IC Plasma ArcWhirl® with Multiple RF Coils
FIG. 5A – ICP Arc Whirl®
FIG. 5B – ICP Arc Whirl® Longitudinal Axis

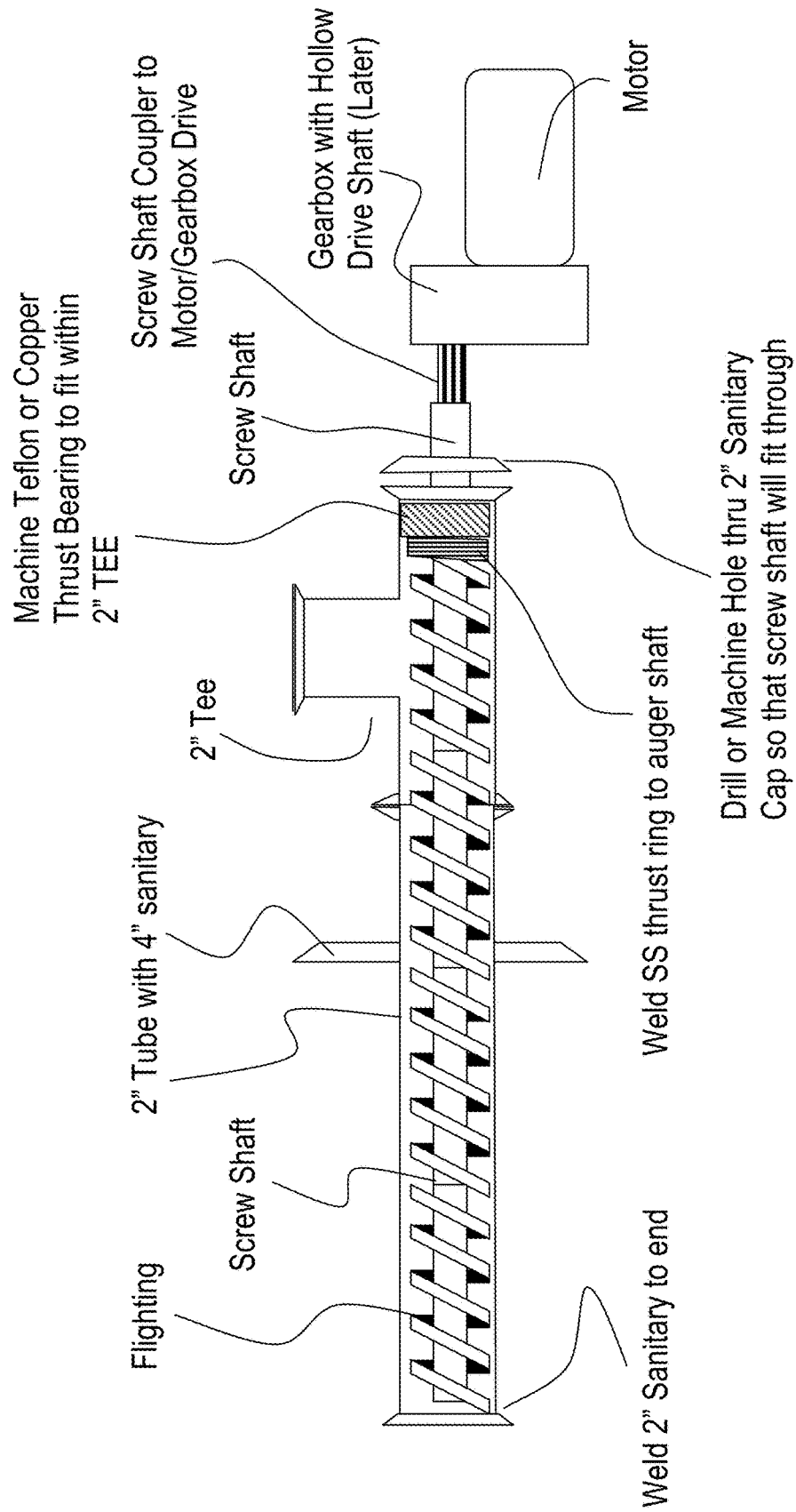
FIG. 6 – ArcWhirl® Straight Screw Feeder

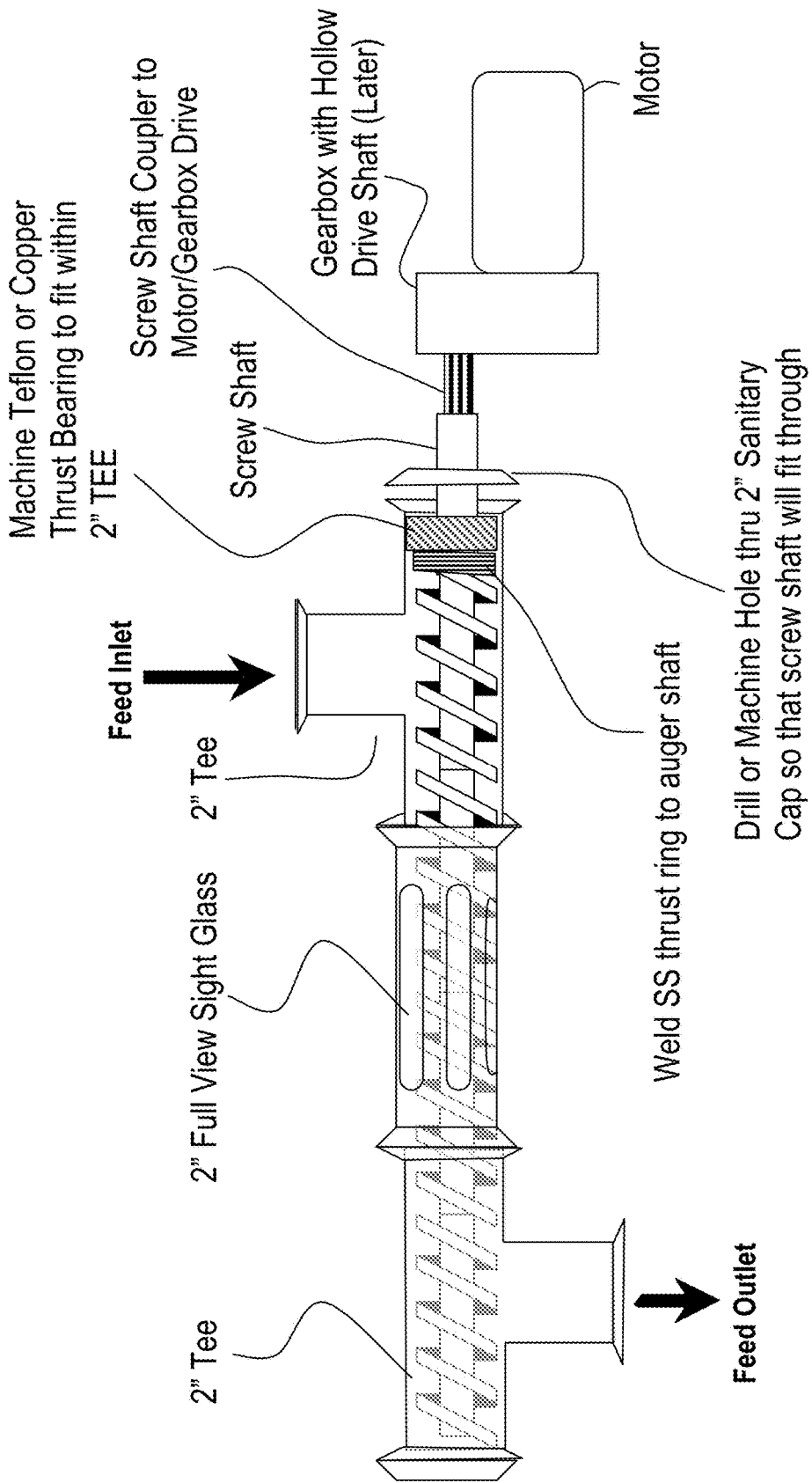
FIG. 7 – ArcWhirl® TEE Screw Feeder

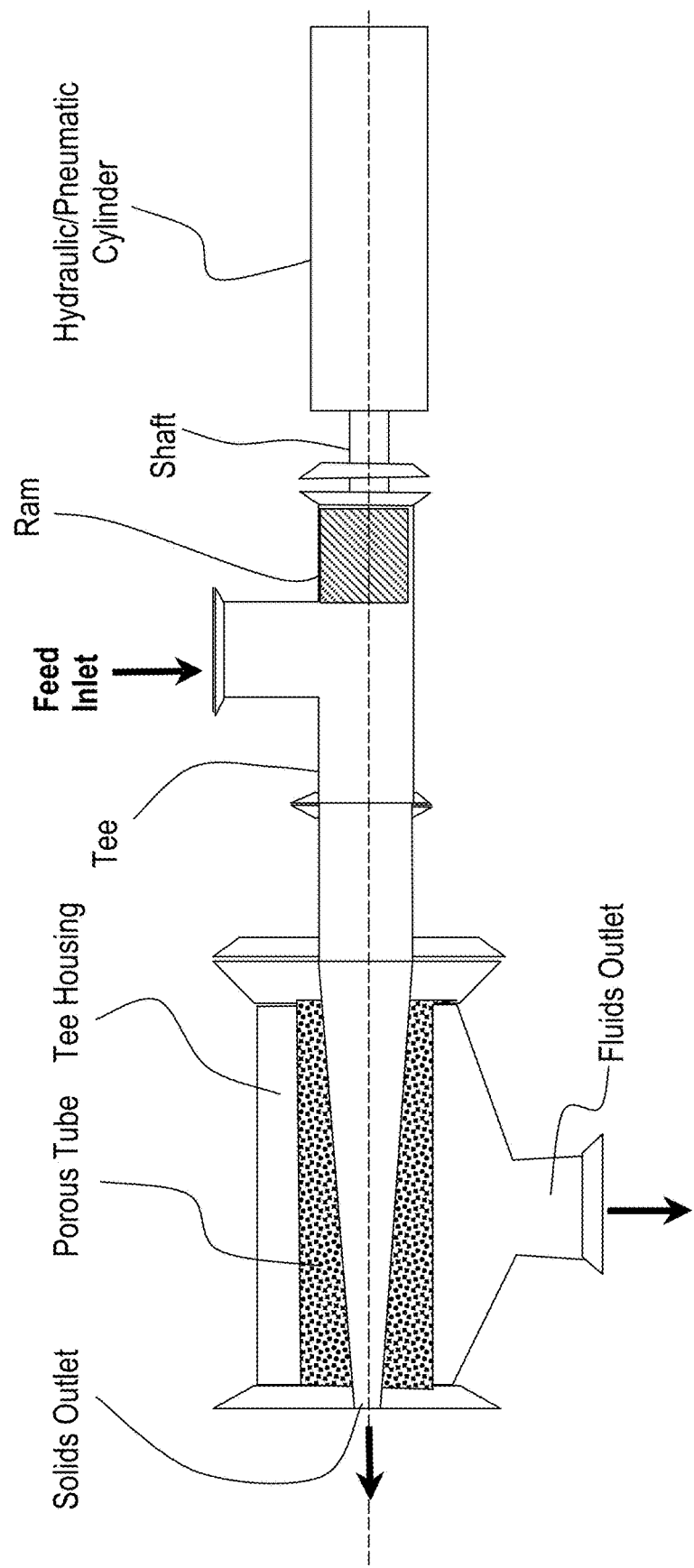
FIG. 8 – ArcWhirl® Straight Ram Feeder Press

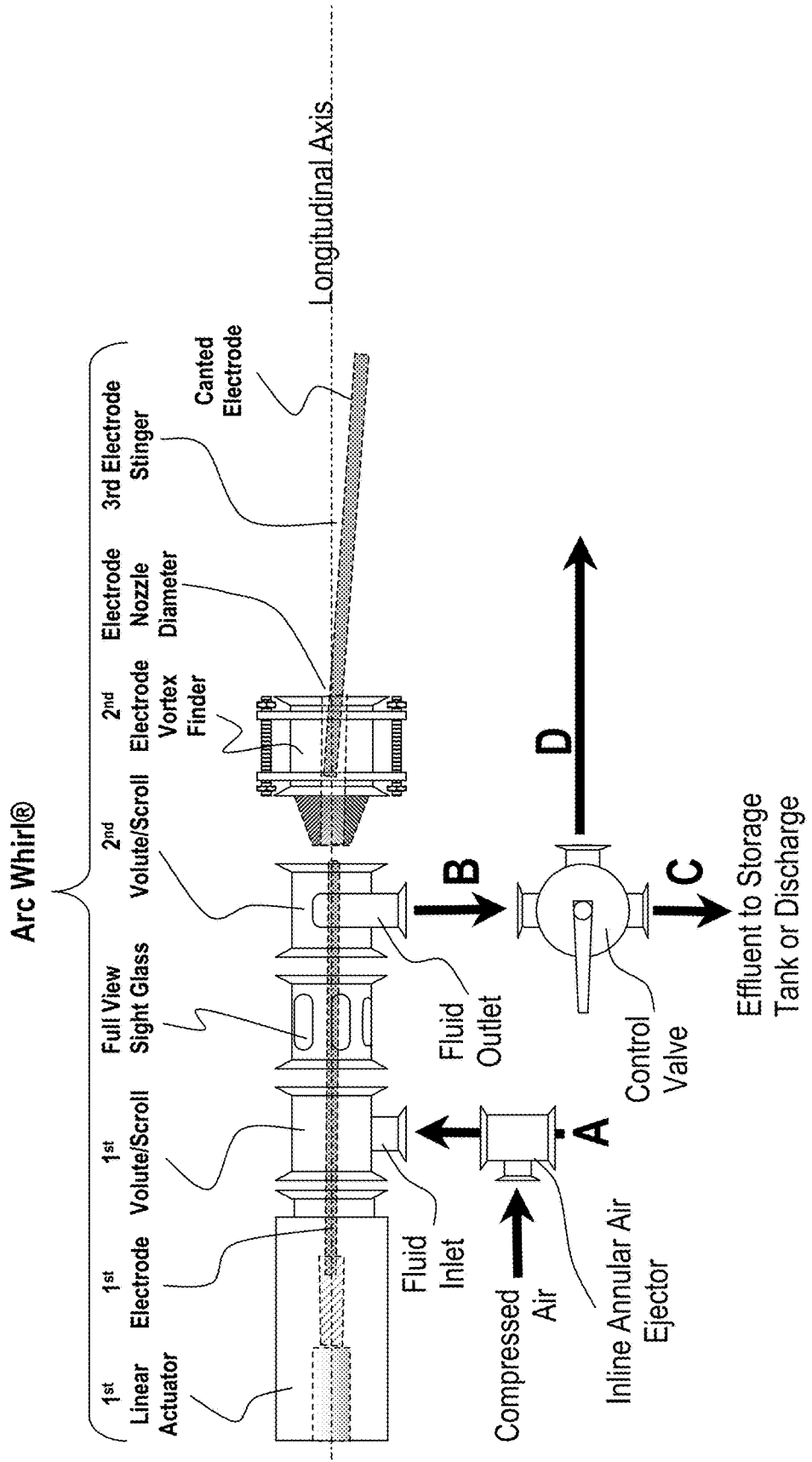
FIG. 9 – ArcWhirl® with Extra Electrode Stinger

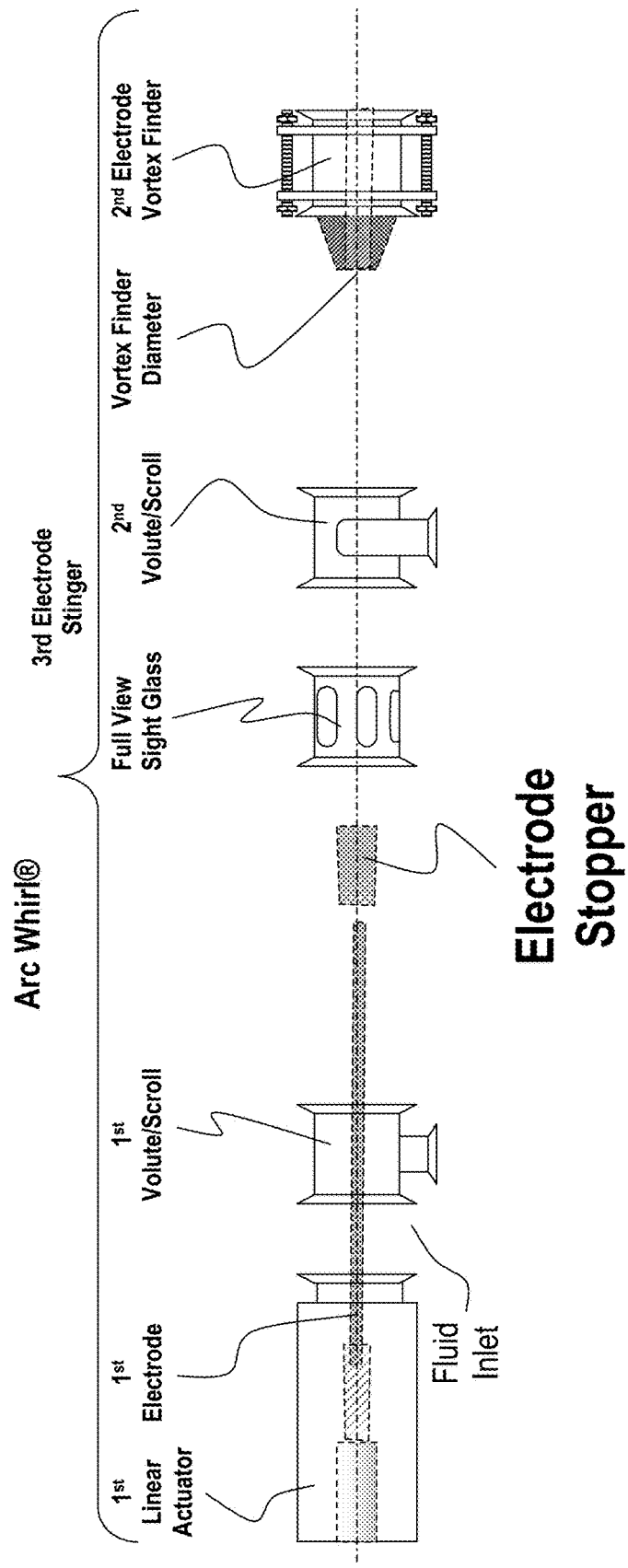
FIG. 10 – ArcWhirl® with Large Electrode Stopper

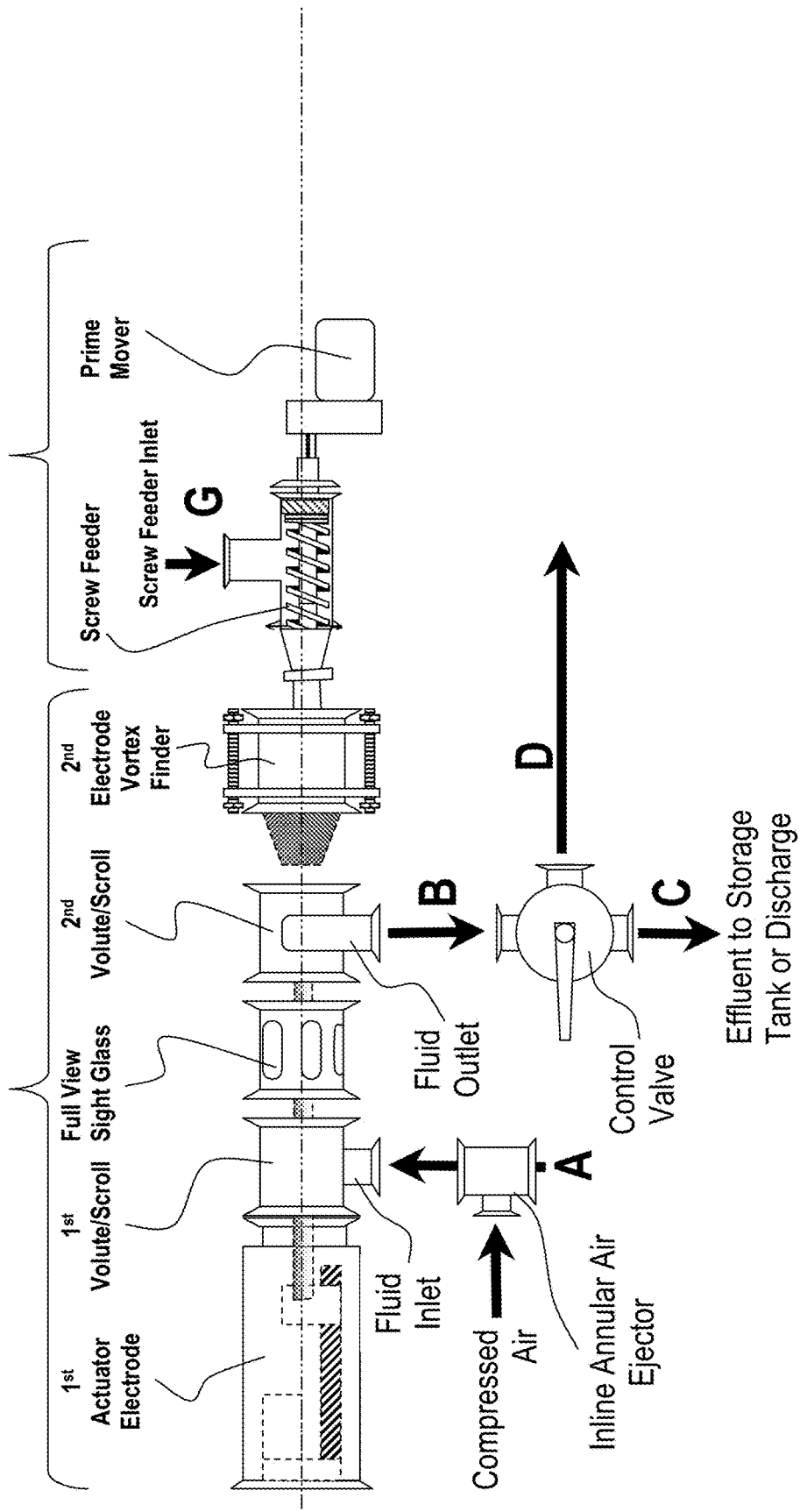
FIG. 11 – ArcWhirl® Original Prototype with Meat Grinder

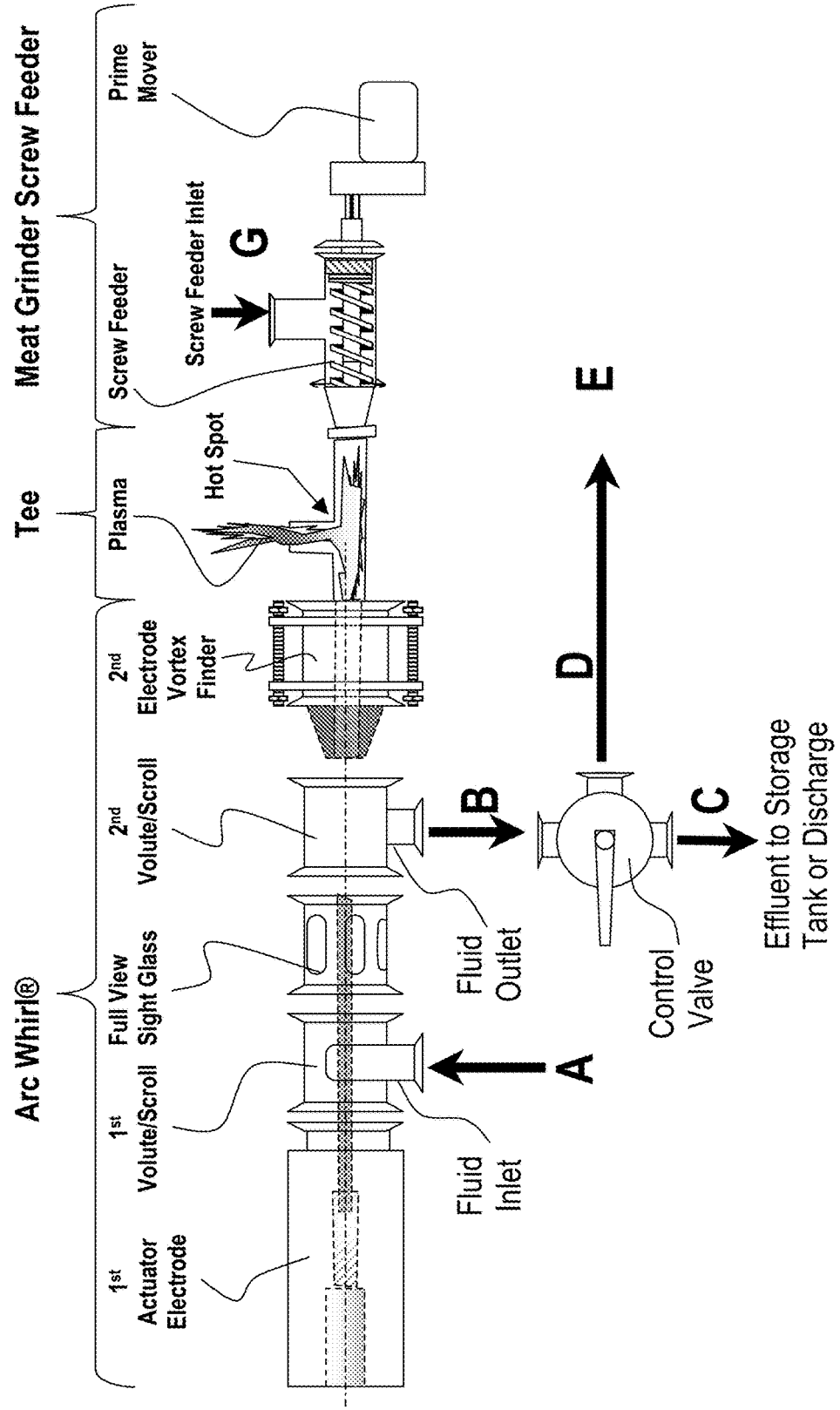
FIG. 12 – ArcWhirl® Prototype with TEE to Meat Grinder

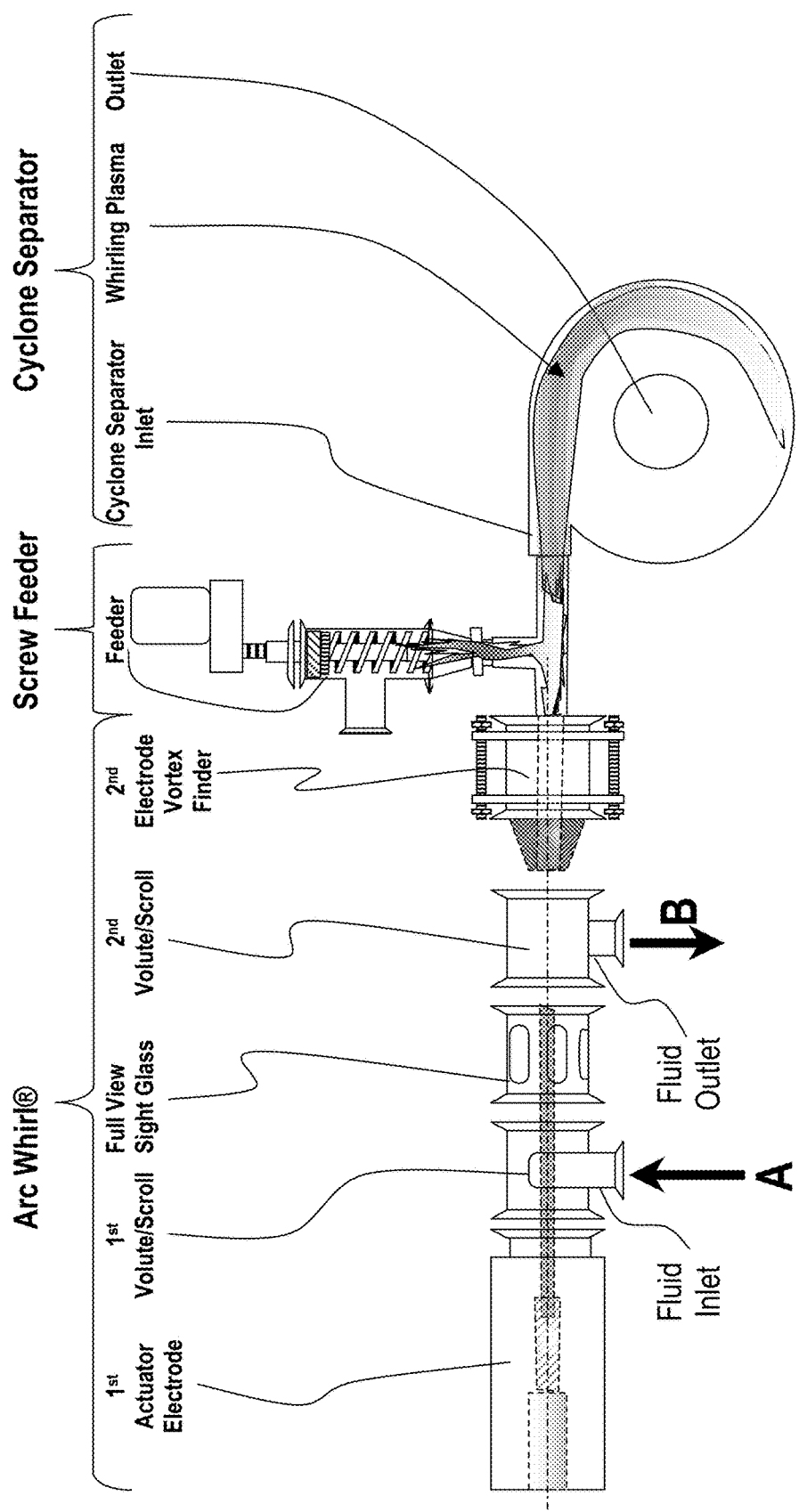
FIG. 13 – Arial View ArcWhirl® Prototype with TEE to Meat Grinder & Cyclone Separator

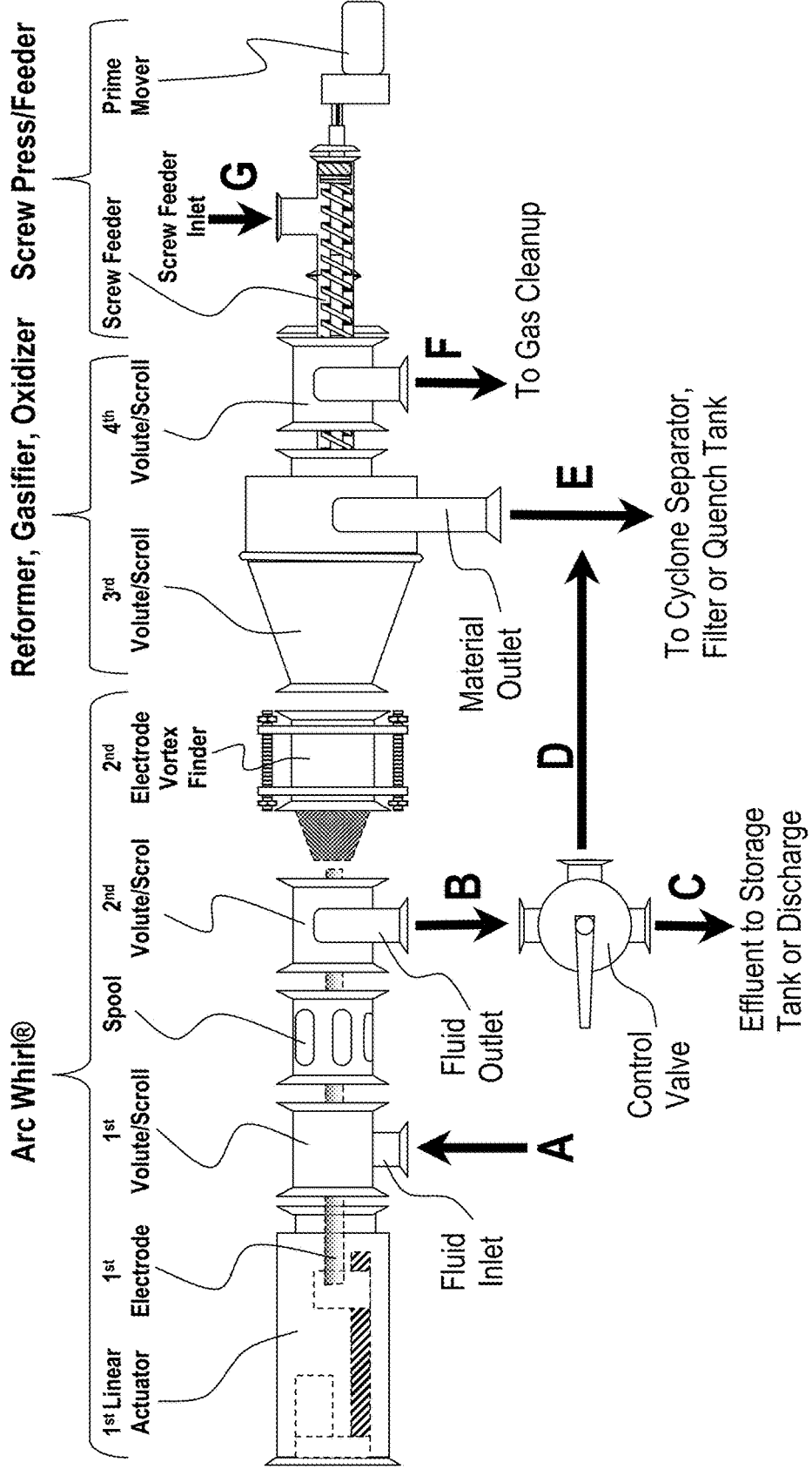
FIG. 14 – ArcWhirl® Single Actuator Straight Feed

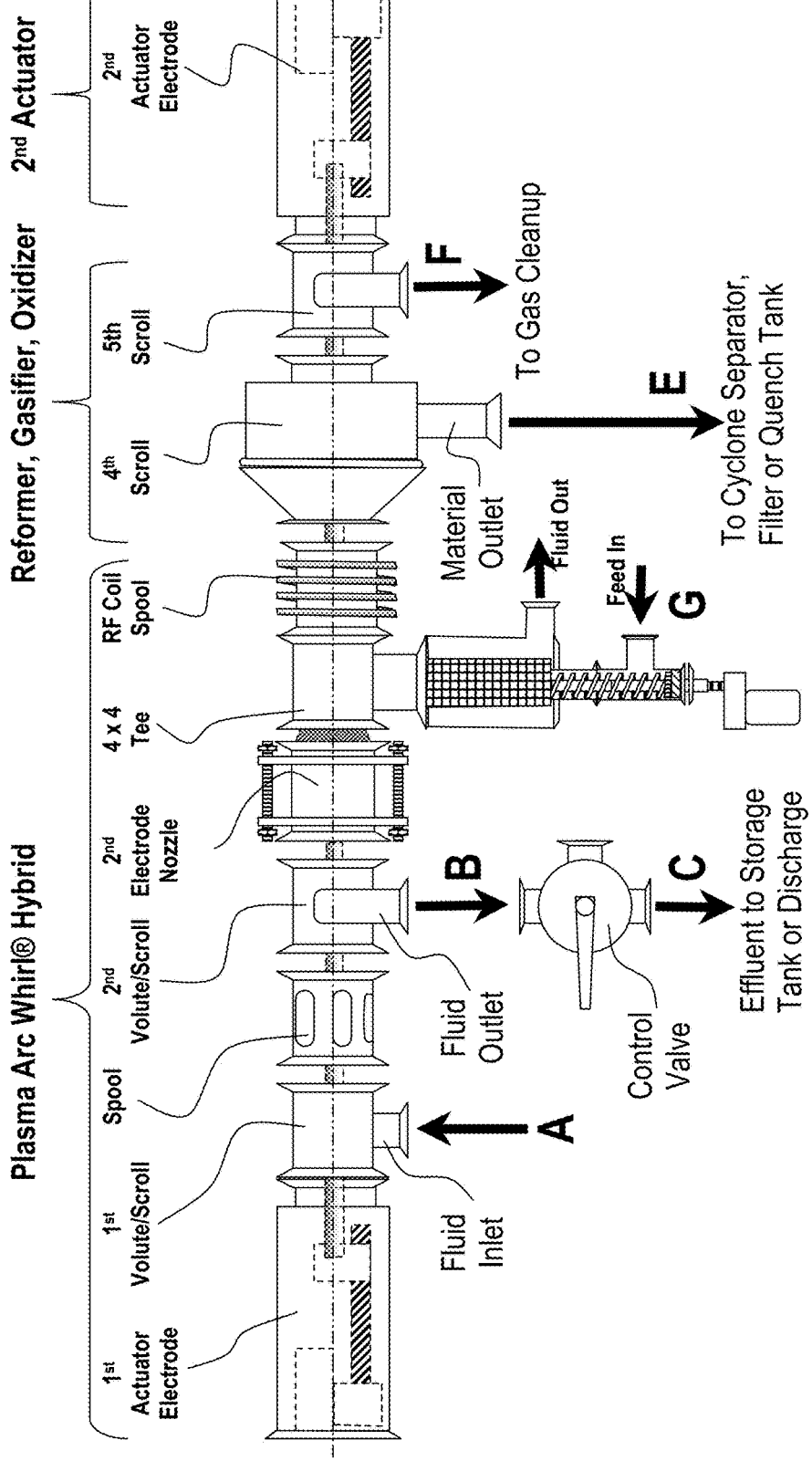
FIG. 15 – ArcWhirl® Dual Electrodes Tee Side Screw Press RF Coil

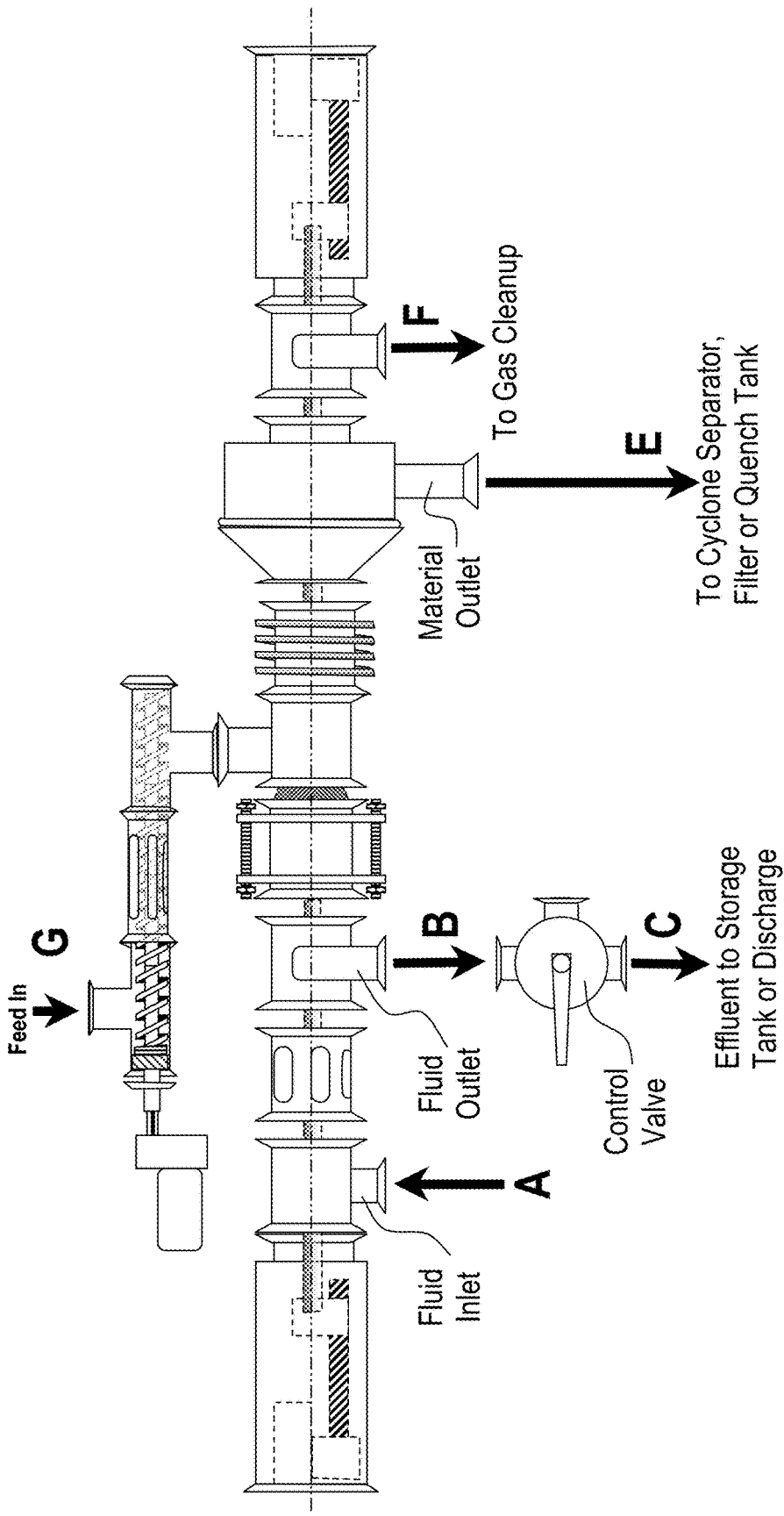
FIG. 16 – ArcWhirl® Dual Electrodes RF Coil TEE Feeder

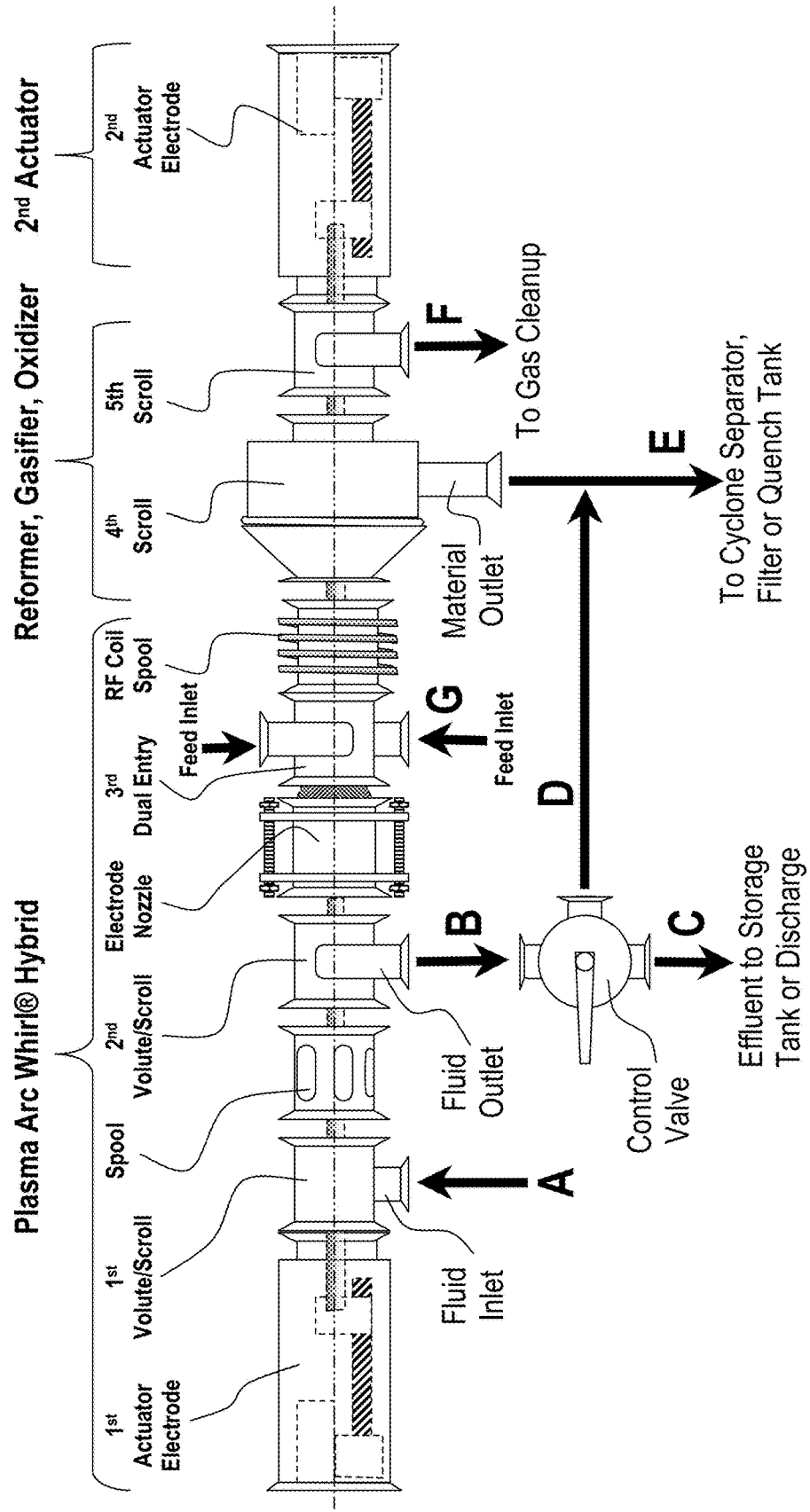

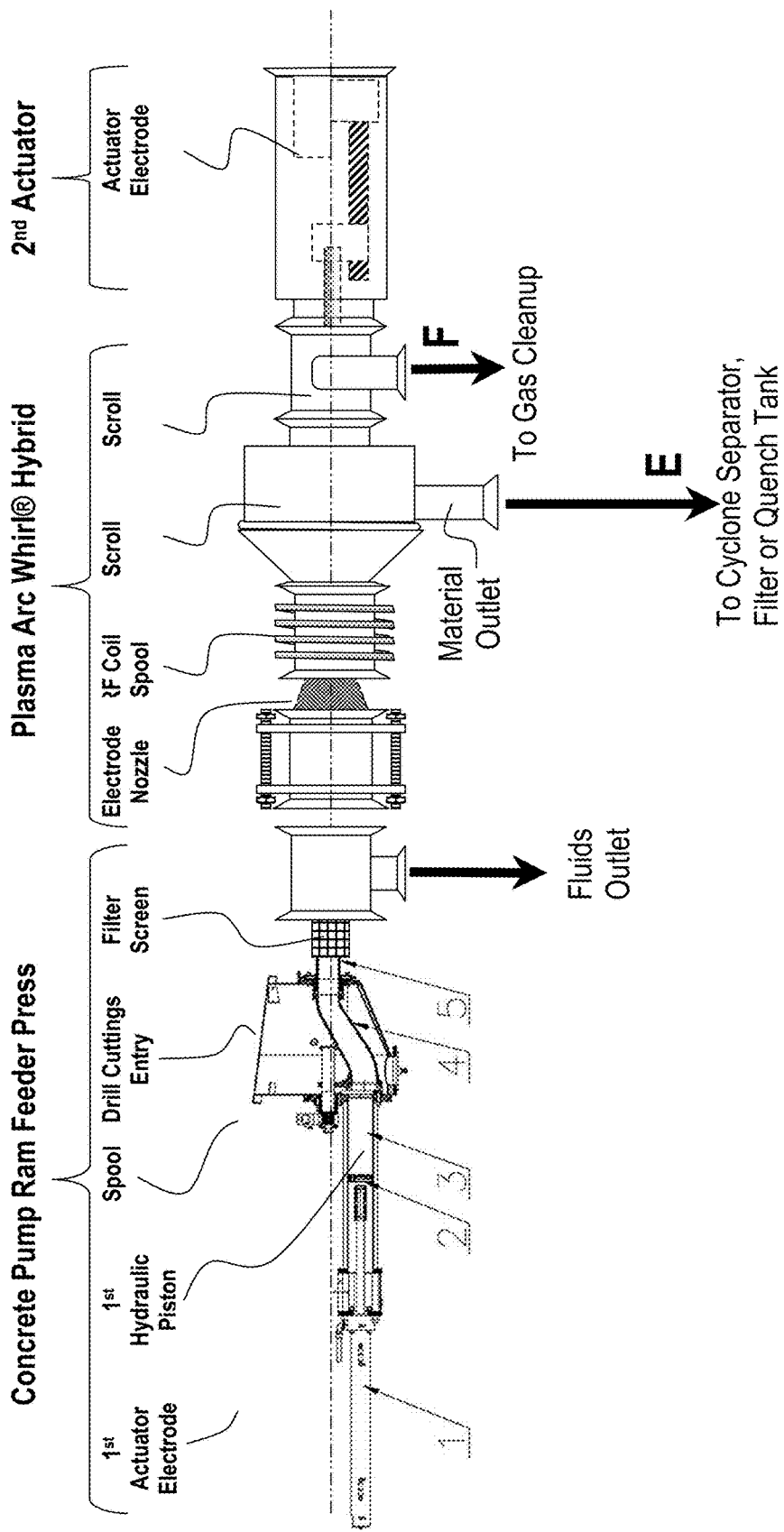
FIG. 18 – IC ArcWhirl® with Cement Pump

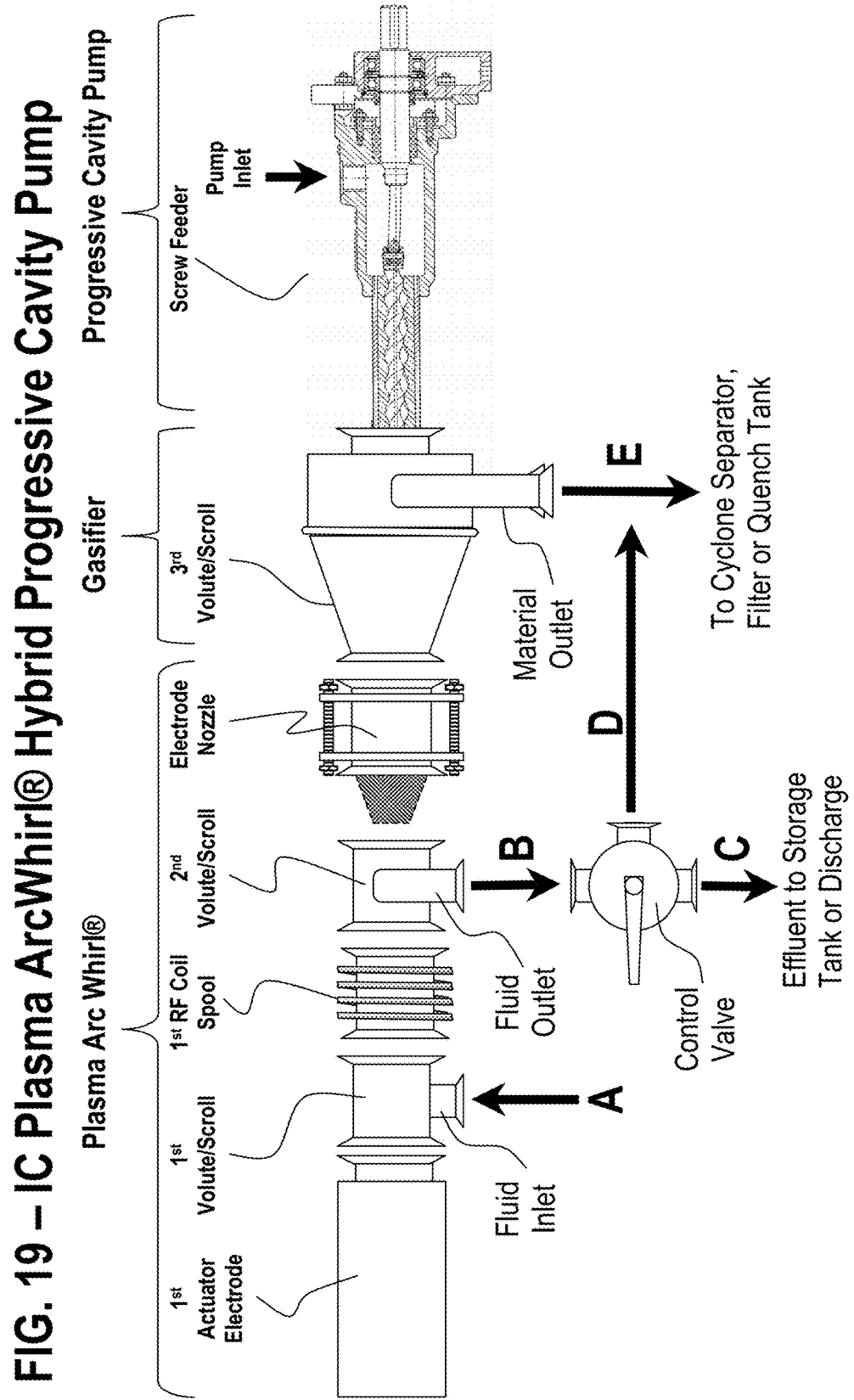
FIG. 19 – IC Plasma ArcWhirl® Hybrid Progressive Cavity Pump

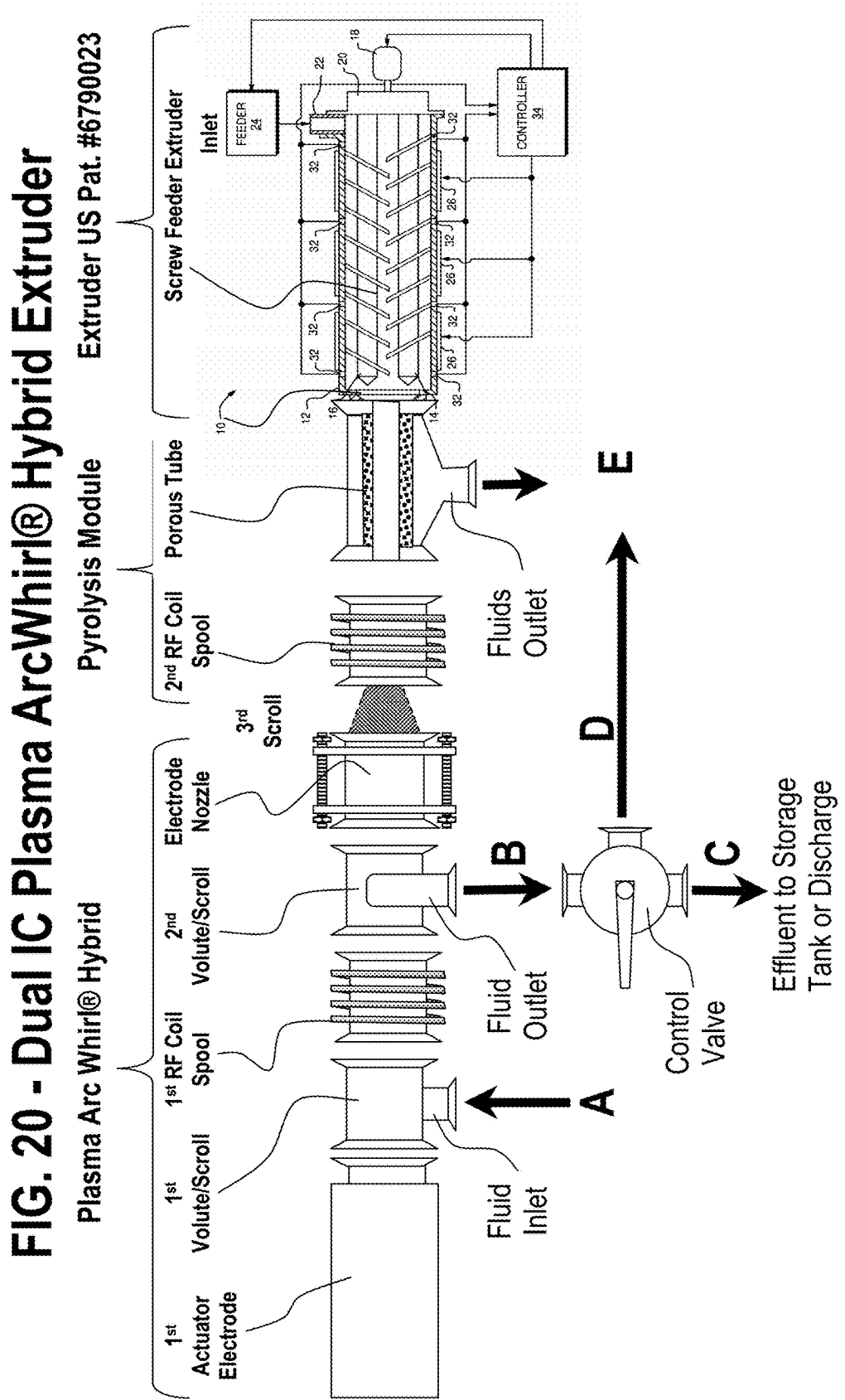
FIG. 20 - Dual IC Plasma ArcWhirl® Hybrid Extruder

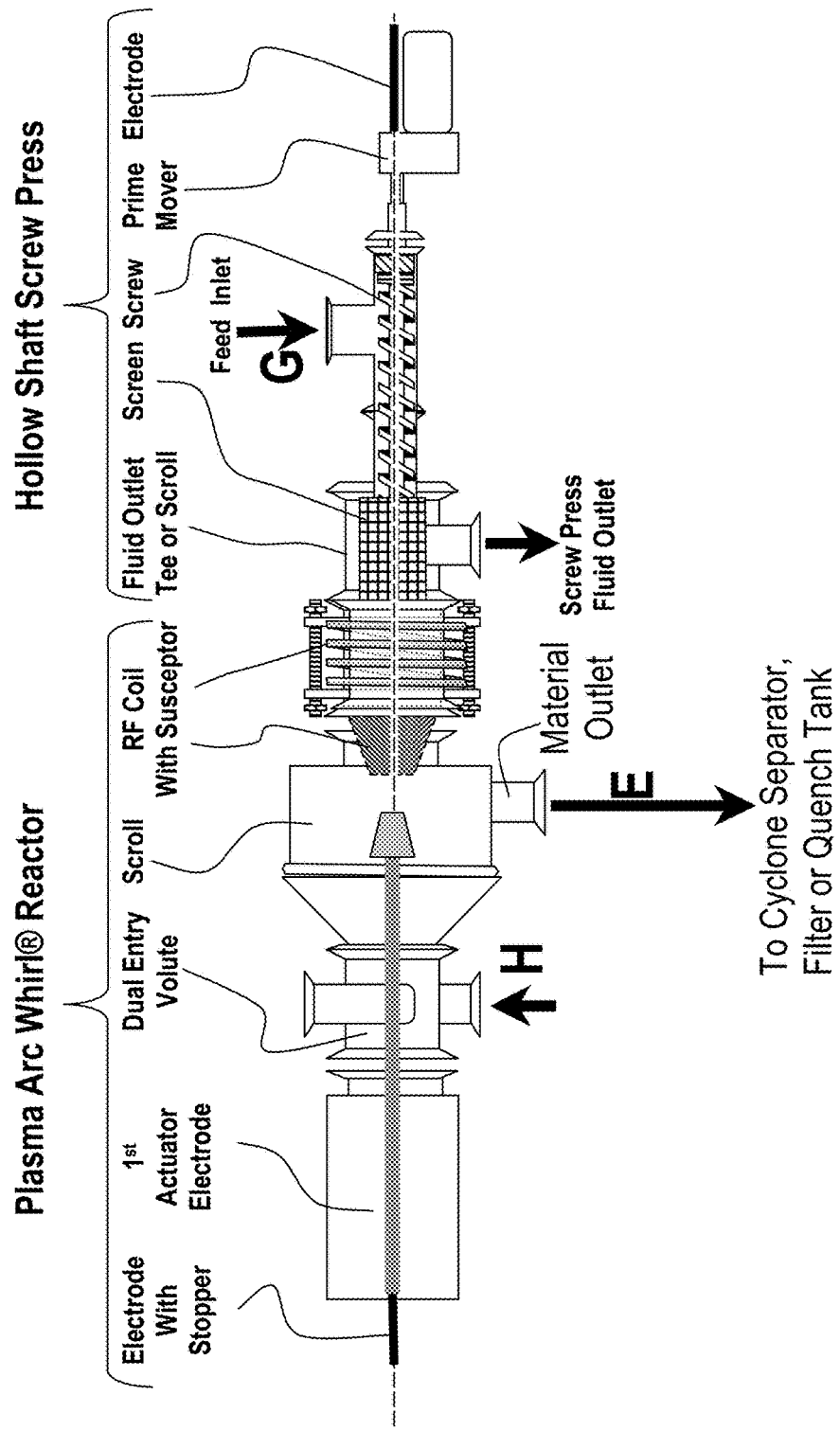
FIG. 21 – IC Plasma ArcWhirl® Screw Press

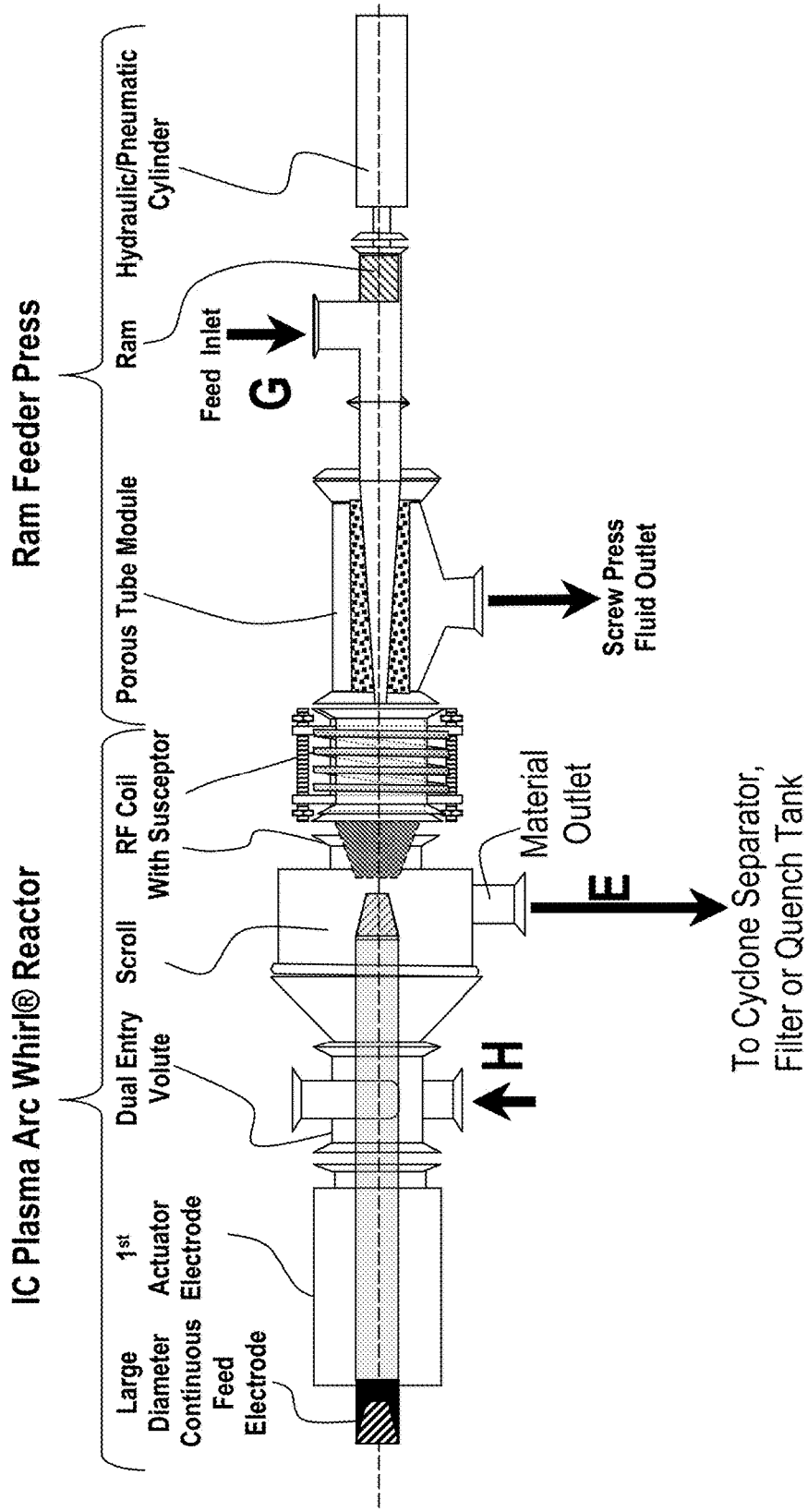
FIG. 22 – IC Plasma ArcWhirl® Ram Feeder Press

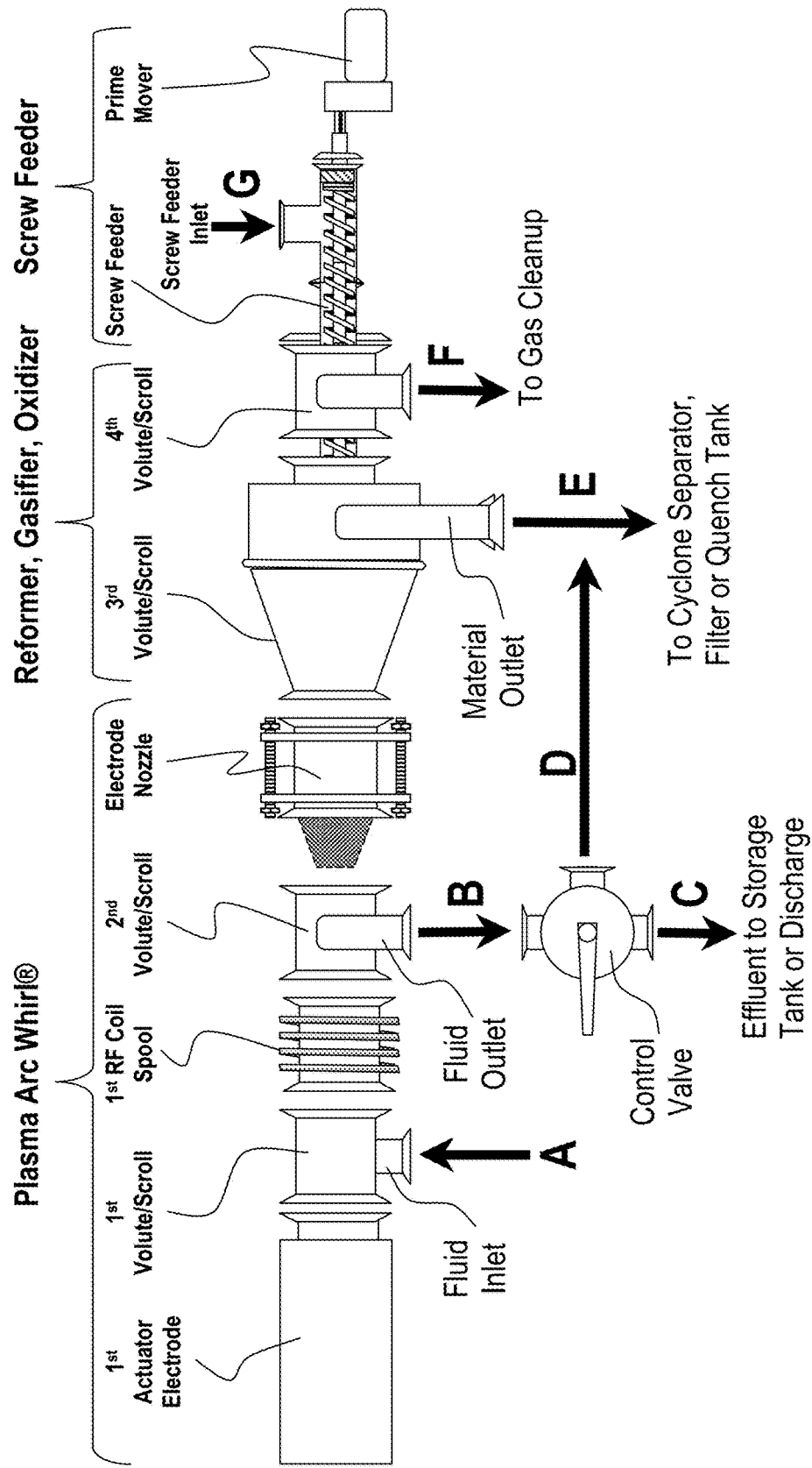
FIG. 23 – IC Plasma ArcWhirl® Hybrid RF Coil 1st Location

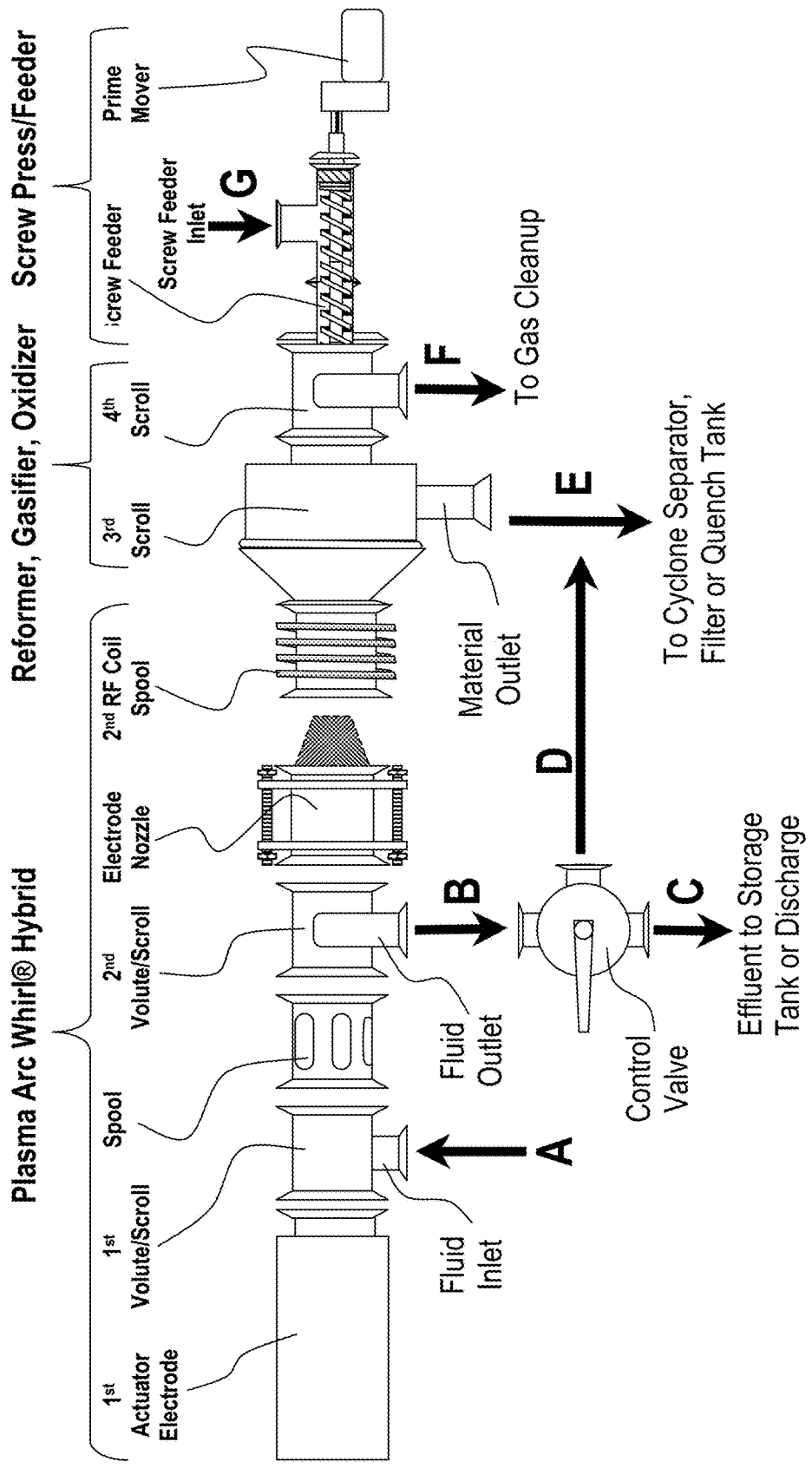
FIG. 24 – IC Plasma ArcWhirl® Nozzle Susceptor with RF Coil

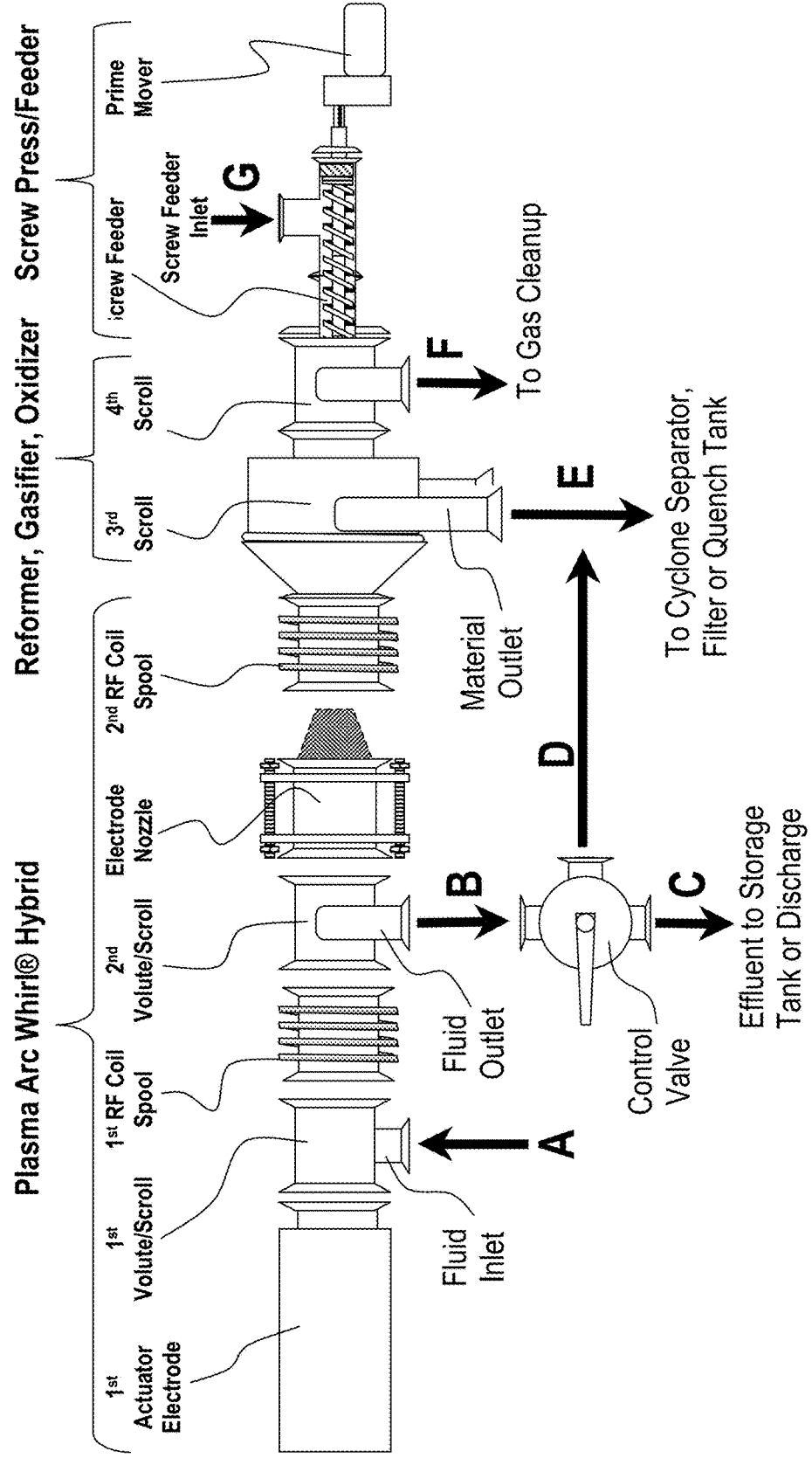

SYSTEM, METHOD AND APPARATUS FOR AN INDUCTIVELY COUPLED PLASMA ARC WHIRL FILTER PRESS

PRIORITY CLAIM AND CROSS-REFERENCE TO RELATED APPLICATIONS

This patent application claims priority to and is (a) a non-provisional patent application of U.S. provisional patent application 61/788,404 filed on Mar. 15, 2013, and (b) a continuation-in-part application of U.S. patent application Ser. No. 13/633,128 filed on Oct. 1, 2012, entitled "Plasma Arc Torch Having Multiple Operating Modes", which is a continuation-in-part application of U.S. patent application Ser. No. 12/371,575 filed on Feb. 13, 2009, now U.S. Pat. No. 8,278,810 (see below). This application also claims priority to PCT patent application PCT/US2013/062941 filed on Oct. 1, 2013, entitled "Plasma Arc Torch Having Multiple Operating Modes".

U.S. patent application Ser. No. 12/371,575 filed on Feb. 13, 2009, now U.S. Pat. No. 8,278,810, and entitled "Solid Oxide High Temperature Electrolysis Glow Discharge", is (a) a continuation-in-part application of U.S. patent application Ser. No. 12/288,170 filed on Oct. 16, 2008 and entitled "System, Method And Apparatus for Creating an Electric Glow Discharge", which is a non-provisional application of U.S. provisional patent application 60/980,443 filed on Oct. 16, 2007 and entitled "System, Method and Apparatus for Carbonizing Oil Shale with Electrolysis Plasma Well Screen"; (b) a continuation-in-part application of U.S. patent application Ser. No. 12/370,591 filed on Feb. 12, 2009, now U.S. Pat. No. 8,074,439, and entitled "System, Method and Apparatus for Lean Combustion with Plasma from an Electrical Arc", which is non-provisional patent application of U.S. provisional patent application Ser. No. 61/027,879 filed on Feb. 12, 2008 and entitled, "System, Method and Apparatus for Lean Combustion with Plasma from an Electrical Arc"; and (c) a non-provisional patent application of U.S. provisional patent application 61/028,386 filed on Feb. 13, 2008 and entitled "High Temperature Plasma Electrolysis Reactor Configured as an Evaporator, Filter, Heater or Torch." All of the foregoing applications are hereby incorporated by reference in their entirety.

This patent application is related to: U.S. Pat. No. 7,422,695; U.S. Pat. No. 7,578,937; and U.S. Pat. No. 7,622,693. All of the foregoing applications are hereby incorporated by reference in their entirety.

FIELD OF THE INVENTION

The present invention relates generally to a system, method and apparatus for coupling a solids, liquids and/or gas conveyance and separation means to an Inductively Coupled Plasma Arc Whirl® torch for treating solids, liquids and gases.

BACKGROUND OF THE INVENTION

It has been said that it is absurd to flush toilets with drinking water. This is not a monumental problem to solve if wastewater from the toilet is treated at the point of generation, commonly referred to as the "CRADLE" and then recycled and continually reused as flush water. If a system existed that could be installed at homes, hotels, restaurants, shopping malls, apartment complexes, buildings and hospitals then an emerging wastewater problem, Pharmaceuticals and Personal Care Products (PPCPs) could be stopped in its tracks since a majority of PPCPs are flushed down a toilet. The US EPA has dedicated a website to PPCPs due to the unprecedented problems associated with the release of PPCPs into receiving waters from WWTPs and Agriculture facilities. See http://www.epa.gov/ppcp/

Garbage is another problem associated with residential homes, hotels, restaurants, shopping malls, apartment complexes, buildings, hospitals and industrial complexes. Landfills are not a sustainable solution to garbage. Many households and institutions have garbage disposals for grinding food waste, which is then sent to a wastewater treatment plant ("WWTP"). This is a waste of a potential fuel source since additional energy in the form of wastewater pumps are used to transfer the ground food waste, a potential energy source, to it final destination.

Wastewater treatment plants are finding it more difficult to dispose of biosolids. Likewise, many wastewater treatment plants are switching from chlorine to UV lights for disinfecting wastewater effluent. In addition, it has been estimated that upwards of 60% of the total power consumed at WWTPs is for aerating wastewater. WWTPs are in dire need of a system which can couple dewatering, gasification and/or combustion of biosolids with a means for providing UV light or ozone disinfection in combination with a means for aerating wastewater.

On an Industrial World Class Size scale, the upstream oil and gas industry is unsurpassed when it comes to equipment size for solids/liquids separation as well as difficult to treat wastewater. In particular, unconventional oil and gas resources, such as the Canadian oilsands has created a massive environmental problem with tailings ponds. Likewise, in situ oilsands development, such as Steam Assisted Gravity Drainage ("SAGD") is in dire need of an all electric water and solids waste treatment system. In order to produce steam, SAGD facilities burn natural gas. Since this is viewed as unsustainable SAGD operators are in dire need of a relatively simple and low cost gasifier for converting bitumen into synthetic gas (Syngas) which is a mixture of carbon monoxide and hydrogen. Typically, at SAGD facilities the fuel gas (natural gas) is fired in boilers, heat recovery steam generators ("HRSG") and gas turbine cogeneration units in order to produce electricity and steam for recovering bitumen. This practice is viewed by many environmentalists as using a clean burning fuel, such as natural gas, to produce "DIRTY OIL."

Furthermore, drilling oil and gas wells produces a solid waste known as drill cuttings. Drill cuttings are typically disposed of either in injection wells or landfills. Offshore, drill cuttings may be dumped overboard if the retention on cuttings ("ROC") of drilling fluids is less than the maximum regulatory limits. A particular unconventional gas resource is shale gas. Shale gas wells must be hydraulically fractured and propped open in order to produce the well. Thus, extremely large volumes of water is combined with proppants and "frac fluid" packages. However, the well returns a portion of the water in combination with salts, proppant fines, gels and guars. The return flow is commonly referred to as Frac Flowback.

Two of the largest unconventional gas plays in the United States are the Haynesville Shale, located in North Louisiana, and the Marcellus Shale located primarily in Pennsylvania. The major drawback and deterrent to drilling shale gas wells is treating the Frac Flowback. In addition, the Deepwater Horizon Oil Spill in the Gulf of Mexico has led to the formation of the Marine Well Containment Company by ExxonMobil, Chevron, ConocoPhillips and Shell. They funded $1 billion for accelerating the engineering, construction and deployment of equipment designed to improve capabilities to contain a potential future underwater blowout in the Gulf of Mexico. ExxonMobil will lead this effort on behalf of the four sponsor companies. Without any doubt there is a DIRE need for deepwater subsea processing in addition to alternatives for preventing a blowout as well as treating submerged emulsions.

According to a National Research Council report, the U.S. coal industry discards annually 70 to 90 million tons of fine refuse to slurry impoundments. Dewatering coal fines is energy intensive. With the push for Clean Coal, many coal enthusiasts are advocating coal gasification. A coal fines dewatering and gasification systems could help usher in Coal Gasification. Likewise, another industry which produces a solid carbon waste can be found within refineries. The end result of coking crude oil is the formation of coke. One of the most useful products for coke is manufacturing carbon or graphite electrodes. A form of gasification, steam reforming, would be a preferred choice for converting pet coke to syngas if coupled to a water treatment means for production of the steam.

SUMMARY OF THE INVENTION

The present invention relates to a system, method and apparatus for submerged combustion, submerged gasification and/or submerged pyrolysis with an Inductively Coupled Plasma ArcWhirl® system. Also, the present invention relates generally to a system, method and apparatus for enhancing the treatment of material with plasma by the addition of natural electrolytes and/or synthetic polyelectrolytes to the material. In addition, the present invention relates to a thermo-chemical process that converts carbon-containing materials, such as bitumen, kerogen, coal, petroleum coke (petcoke), natural gas, biogas, biomass, biosolids, fossil fuel waste such as oil sand tailings, coal fines, refinery sludges and tank bottoms, waste biomass (food, garbage, municipal, etc.), or other materials, with little or no oxygen present and at high temperatures, into a synthesis gas (syngas) and inert solids. In addition, the present invention includes a novel system, method and apparatus for plasma research and development.

Moreover, the present invention provides a means for coupling the treatment of toilet flushed water, commonly referred to as BLACK WATER, with dewatering and thermal treating of biomass such as food waste, grass clippings, leaves, and wood waste could solve the two aforementioned problems. Excess heat and power generated from this system can be used for distributed wastewater and solids treatment and Combined Heat and Power ("CHP") on a distributed level, such as homes, hotels, hospitals, university campuses, buildings, malls and industrial manufacturing facilities all which generate and discharge wastewater to sewer drains which convey wastewater to lift stations. The present invention couples dewatering, gasification, steam reforming and/or lean combustion and water treatment into one apparatus that can easily be scaled up for world class size facilities such as oil sands, shale gas, shale oil, coal power plants and refineries.

In addition, the present invention provides a Research and Development Plasma Tool Kit that can be operated in various modes with various streams in order to demonstrate to scientists, engineers and developers that Plasma is capable of delivering "Heat" and "Treatment" at both reduced capital expenses and operating costs. The R&D Plasma Tool Kit is capable of being scaled up to world-class size with more or less off-the-shelf components, parts and power supplies that are similar in design, function and operation to the R&D Kit. The R&D Plasma Tool Kit can be applied to solving the aforementioned water, gasification and plasma confinement problems, and allows for rapid assessment of the potential for an all electric Heavy Oil and Water Treatment System for SAGD, all electric deepwater subsea processing for oil and gas, an all electric system for treating biosolids and wastewater and an all electric carbon capture system via production of biochar from biomass, in addition to the potential for gasifying coal. Likewise, the R&D Kit itself may be of sufficient size thus suitable for use in smaller applications such as at home residences, restaurants, institutions, hospitals and hotels.

The present invention provides a plasma treatment system that includes a plasma arc torch, a tee attached to a hollow electrode nozzle of the plasma arc torch, and a screw feed unit or a ram feed unit having an inlet and an outlet attached to the tee. The plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 1 is a cross sectional view of an Inductively Coupled Plasma ("ICP") ArcWhirl® in accordance with one embodiment of the present invention;

FIG. 2 includes FIG. 2A which is a cross sectional view of the original ArcWhirl® and FIG. 2B which is a cross sectional view of the present invention ICP ArcWhirl® in accordance with one embodiment of the present invention;

FIG. 3 includes FIG. 3A which is a cross sectional view of the original ArcWhirl® and FIG. 3B which is a cross sectional view of the present invention ArcWhirl® with a Vortex Finder Electrode in accordance with one embodiment of the present invention;

FIG. 4 includes FIG. 4A which is a cross sectional view of the original ArcWhirl® with a RF Coil and FIG. 4B which is a cross sectional view of the present invention ICP ArcWhirl® in accordance with one embodiment of the present invention;

FIG. 5 includes FIG. 5A which is a cross sectional view of the original ArcWhirl® with multiple RF Coils and FIG. 5B which is a cross sectional view of the present invention ICP ArcWhirl® in accordance with one embodiment of the present invention;

FIG. 6 is a cross sectional view of an ArcWhirl® Straight Screw Feeder in accordance with one embodiment of the present invention;

FIG. 7 is a cross sectional view of an ArcWhirl® TEE Screw Feeder in accordance with one embodiment of the present invention;

FIG. 8 is a cross sectional view of an ICP ArcWhirl® Straight Ram Feeder in accordance with one embodiment of the present invention;

FIG. 9 is a cross sectional view of an ArcWhirl® with Extra Electrode Stinger in accordance with one embodiment of the present invention;

FIG. 10 is a cross sectional view of an ArcWhirl® with Large Electrode Stopper in accordance with one embodiment of the present invention;

FIG. 11 is a cross sectional view of the ArcWhirl® Original Prototype with Meat Grinder in accordance with one embodiment of the present invention;

FIG. 12 is a cross sectional view of the ArcWhirl® Prototype with TEE to Meat Grinder in accordance with one embodiment of the present invention;

FIG. 13 is a aerial view of an ArcWhirl® with TEE to Feeder & Cyclone Separator in accordance with one embodiment of the present invention;

FIG. 14 is a cross sectional view of an ArcWhirl® 4" Single Actuator Straight Feed in accordance with one embodiment of the present invention;

FIG. 15 is a cross sectional view of an ArcWhirl® Dual Electrodes RF Coil Tee Screw Press in accordance with one embodiment of the present invention;

FIG. 16 is a cross sectional view of an ArcWhirl® Dual Electrodes RF Coil 2" TEE Feeder in accordance with one embodiment of the present invention;

FIG. 17 is a cross sectional view of an IC Plasma ArcWhirl® Dual Electrodes Dual Feed in accordance with one embodiment of the present invention;

FIG. 18 is a cross sectional view of an IC Plasma ArcWhirl® with Cement Pump in accordance with one embodiment of the present invention;

FIG. 19 is a cross sectional view of an IC Plasma ArcWhirl® Hybrid Progressive Cavity Pump in accordance with one embodiment of the present invention;

FIG. 20 is a cross sectional view of an IC Plasma ArcWhirl® Nozzle Hybrid Extruder in accordance with one embodiment of the present invention;

FIG. 21 is a cross sectional view of an Dual IC Plasma ArcWhirl® Screw Press in accordance with one embodiment of the present invention;

FIG. 22 is a cross sectional view of an IC Plasma ArcWhirl® Ram Feeder Press in accordance with one embodiment of the present invention;

FIG. 23 is a cross sectional view of an IC Plasma ArcWhirl® Nozzle Hybrid in accordance with one embodiment of the present invention;

FIG. 24 is a cross sectional view of a Dual IC Plasma ArcWhirl® Hybrid in accordance with one embodiment of the present invention; and FIG. 25 is a cross sectional view of an IC Plasma ArcWhirl® Hybrid in accordance with one embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

By centrally locating both electrodes within a hydrocyclone as disclosed in U.S. Pat. Nos. 7,422,695 and 7,578,937 which is referred hereinafter as the Arc Whirl® the inventor of the present invention has further improved its function and novelty by coupling it to the patented Plasma Whirl® Reactor. The Plasma Whirl® Reactor and Methods of Use (U.S. Pat. No. 7,622,693) discloses a inductively coupled Plasma Whirl® Reactor. The present invention couples both technologies to form a hybrid Inductively Coupled Plasma Arc Whirl® in addition to means for conveying material directly into the plasma arc which solves the problem of feeding material into a plasma gasifier, fast quench reactor, incinerator, combustor or boiler.

Turning now to FIG. 1, both the ArcWhirl® and PlasmaWhirl® can be dramatically improved by merging the inventions together. As disclosed in the ArcWhirl® and in the present invention a first electrode 20 is axially aligned with a second electrode 21. The electrodes are electrically connected to a DC power supply. A Radio Frequency ("RF") coil 23 is placed around the first electrode 20 and the second electrode 21. A thin film of fluid as shown by arrow A is whirled around the electrodes. Similar to arc welding with an electrode, the electrodes are axially pushed toward one another and touched together in order to form a dead short. When the electrodes are pulled away from one another an electrical arc 22 is formed between the electrodes thus completing the DC circuit. As electrons flow thru the arc, any gas that is present near the arc will be converted into plasma. Thus, a plasma plume will be formed near the arc 22 and the hot electrodes 20 and 21. Next, the RF coil 23 is energized from an RF power supply and the RF photons emitted from the RF Coil 23 are coupled to the plasma thus enhancing its attributes. Hence, since the electrodes 20 and 21 were attached to linear actuators as disclosed in the Arc Whirl® patents, the electrodes can then be completely withdrawn from the coil module. On the other hand, one or both electrodes 20 and 21 may be fed continuously to couple to the RF field thus maintaining a plasma plume at all times. The electrode, either 20 or 21 or both would then be used as susceptor(s) for coupling the RF field to the electrodes 20 and 21 for heating the electrode in order to enhance thermionic emission. Thus, the power from the DC power supply to the electrodes can be reduced or even turned off when the electrodes are operated as a RF susceptor. This configuration as disclosed in FIG. 1 can be operated as a hybrid Inductively Coupled Plasma ("ICP") Arc Whirl® Torch by simply allowing the gas to exit at one end by using a vortex finder 13 as shown in FIG. 2A which is common with all cyclones and hydroclones.

It is well known and well understood that ICP torches have several drawbacks. First, it is difficult to ignite a plasma at a lower frequency for example at 5 kilohertz to 150 kilohertz. Thus most ICP torches use an inert and easily ionizable gas in combination with a high temperature susceptor. In fact, many ICP mass spectrometers use a hollow susceptor, in which the material to be analyzed is injected within the inside of the hollow susceptor. Likewise, many ICP torches use a much higher frequency than 150 kilohertz in order to ignite the inductively coupled plasma. Second, it is quite difficult to sustain the plasma within an ICP torch when waste material is introduced directly into the ICP torch. Furthermore, if the material contains volatiles, such as water within oil sands bitumen or bound water within pressed biosolids (70% to 80% water), then this adds to the volume of gas within the torch itself. Hence, the limited use of ICP torches for processing waste material directly within the torch housing or vessel.

Currently, many developers and engineers are specifying the use of Non-Transferred Electrical Arc torches for applications such as waste processing, in particular municipal solid waste ("MSW"). However, Non-Transferred Electrical Arc Torches suffer from having relatively short electrode life, thus are considered not applicable for 24/7 365 day operations, such as coal gasification for utilities, steam reforming natural gas for hydrogen use at refineries and biosolids gasification and/or incineration at wastewater treatment plants. Finally, plasma confinement has been and still remains the single largest problem as to why plasma has not been adopted worldwide for processing materials in lieu of heating and processing with a fossil fuel combustion flame either directly or indirectly through a heat exchanger. This is true regardless if it is an ICP torch, Microwave Torch or AC or DC Torch. Typical plasma systems use inertial or magnetic confinement or a combination of both. However, the confinement problem arises when the plasma plume is injected into a refractory lined or water cooled reactor. Hence, the plasma plume is at a much higher temperature than the melting point of the refractory lining of the reactor. And in the case of water jacketed reactors, the cooling water is usually rejected as heat in a heat exchanger. In addition, most plasma torches use cooling water and reject upwards of 30% of the total electrical power applied to the electrodes as waste heat. The present invention overcomes the problems associated with heat rejection, electrode life and plasma ignition, confinement and sustainment common with typical plasma torches.

Referring to FIG. 2, the Original ArcWhirl® as shown on the left hand side of the drawing sheet FIG. 2A has not had any problems with plasma confinement. This is due in part to two reasons. First, the electrical arc and plasma are confined with the whirling fluid's inertia. The angular momentum of the whirling fluid ensures that more dense fluids, such as water, bitumen, kerogen and/or heavy oil stay near the internal wall of the ArcWhirl®, while less dense fluids such as air, oxygen, nitrogen, natural gas and/or volatiles remain near the central axis of the ArcWhirl®. Second, since the electrodes 20 and 21 are centered within the cyclone and axially aligned, then the arc remains centered and attached between the electrodes. One of the results which was completely unexpected from operating the ArcWhirl® was that the arc could not be blown-out, regardless of how much fluid was flowed and whirled within the ArcWhirl®. This is in contrast to all of the data, results and published operating information and manuals for Transferred-Arc, Non-Transferred Arc and ICP Torches. In typical Plasma Torches the gas flow or fluid flow must be precisely metered in order to not extinguish the arc and/or plasma. That is one of the major drawbacks with plasma torches—sustaining the plasma—or simply keeping the torch lit! The major problems associated with plasma torches—ignition, confinement, sustaining/maintaining and electrode life—are completely resolved with the ArcWhirl®.

If plasma is to be used for everyday heating applications, thus replacing fossil fuels and allowing for an all electric high temperature heater and/or steam generator, then the plasma torch components must be readily available. The ArcWhirl® has been operated with four 12 volt batteries in series. Likewise, the ArcWhirl® is currently being operated with an ESAB ESP 150 DC power supply. This is a commonly available SCR plasma cutting power supply. Commonly available plasma cutting power supplies are limited to about 120 kw. For world class size DC power supplies, Ametek HDR will custom manufacture a DC power supply to about 15 MW.

Returning to FIG. 2, the original ArcWhirl® as disclosed in FIG. 2A can easily be converted to an ICP ArcWhirl® by simply retrofitting the vortex finder 13, body 10 or apex valve 12 with an RF Coil Assembly 24 as disclosed in FIG. 2B. This configuration allows for using common plasma DC power supplies, DC batteries, or any DC source, small diameter electrical leads and small diameter electrodes in addition to a small diameter cyclone. It is well known that as diameter increases within a cyclone, the "CUT" increases, thus allowing more particles to be entrained within the clean fluid.

FIG. 3A discloses the carbon electrode 21 extending thru the Apex Valve 12 and into the Body 10 of the Original ArcWhirl®. Now referring to FIG. 3B, the ArcWhirl® is modified by replacing the carbon electrode with a Electrode Vortex Finder while still being aligned along the central axis of the ArcWhirl® cyclone. This configuration was designed in order to operate as a plasma torch by blowing a plasma out of the ArcWhirl® as shown by the Plasma Arrow. When operated only with a gas the electrical arc was blown out of the Nozzle and wrapped back around to the outside face of the Carbon Electrode Vortex Finder Nozzle.

One of the most difficult problems to solve with a pressurized gasifier is how to feed solid material to the gasifier. Referring to FIGS. 4A and 4B, by placing the RF coil assembly within the body of the original Arc Whirl®, a much smaller DC power supply can be used for the carbon electrodes while combined with a more powerful RF power supply and RF coil or several RF power supplies and coil. By using an EDUCTOR/EJECTOR VENTURI any solid material can be fluidized and conveyed with a FLUID and hydraulically or pneumatically conveyed into the "NEW" ICP ArcWhirl® as shown in FIG. 4B. The ICP ArcWhirl® is both the ICP torch and the gasifier. Thus, a separate reactor is not required for plasma gasification. However, it will be fully understood that this configuration or multiple Plasma ArcWhirls® may be used for feeding solid material into a pressurized gasifier.

Ambrell, formerly known as Ameritherm, manufacturers a good suite of RF power supplies and coils well suited for the Plasma ArcWhirl®. The EkoHeat RF power supplies frequency ranges from 5-150 kilohertz kHz) with power ratings from 1 kw upwards to 250 kw. See http://en.ambrell-.com/cat/product_ekoheat.php. These frequencies and power ratings are ideal for the compact IC Plasma ArcWhirl®.

Referring now to FIG. 5A, multiple RF Coil Assemblies are added to the ArcWhirl®. This gives rise to a unique system for operating an ICP Torch. The ICP ArcWhirl® torch can use any fluid as its plasma gas. In addition, it eliminates the traditional problems associated with common ICP torches such as plasma ignition, sustainment and confinement. For example, water and any non-condensible gas can be coflowed into the ICP Plasma ArcWhirl® as shown by the EDUCTOR/EJECTOR shown in FIG. 5B. Since water is more dense then gas, then due to centrifugal forces the water will be forced outward and through EXIT B, while a part of the gas will be ionized and exit via the nozzle as a plasma. The ICP ArcWhirl® is started by first introducing a fluid A into the ArcWhirl®. The 1st Linear Actuator axially moves the 1st electrode to touch the 2nd Electrode Vortex Finder. The DC power supply is turned on while the electrodes are in a DEAD SHORT. It has recently been discovered that if the electrodes are wet, then by holding the electrodes in a dead short, the electrodes will heat up due to resistive heating. Next, the 1st electrode is drawn back thus forming an arc. Any gas near the arc will be converted to a plasma. Now, the RF power supply can be turned on to energize the RF Coil in order to couple RF photons to the plasma. What is unique and unobvious about this operation is that high frequency RF is not necessary in order to operate the ICP ArcWhirl®. Once the ICP ArcWhirl® is operating, the DC power to the electrodes may be turned off. Since the electrodes are electrically conductive, the RF photons will couple to the electrodes. Thus, the electrodes are also RF susceptors. Since the electrodes will be heated with both plasma and RF photons, the electrodes will emit electrons due to thermionic emission. This will ensure that the plasma stays lit. One other benefit for using carbon electrodes is that they are consumable and can be continuous fed to the ArcWhirl®. In addition, if any oxygen is present, the oxygen and carbon will combust, thus allowing for reduction in electrical power to the RF coil and/or electrodes. In addition, this opens the door to a truly unique and unobvious STEAM REFORMING METHOD. Any carbonaceous matter, fossil or biomass, can be fed to the ICP ArcWhirl®. When the material begins to carbonize, it will become electrically conductive. Likewise, the addition of steam allows for the following STEAM REFORMING REACTION and WATER GAS SHIF REACTION to occur within the same Reactor:

$$C + H_2O \text{ (steam)} \rightarrow CO + H_2 \quad (1)$$

$$CO + H_2O \text{ (steam)} \rightarrow CO_2 + H_2 \quad (2)$$

This opens the door for a unique system for generating a hot gas for Steam Assisted Gravity Drainage for In Situ Oil Sands Operations. This will be clearly demonstrated in the following examples.

Any conveyance means can be used for feeding a solid, semi-solid, viscous fluid or hard to pump material into the ArcWhirl®. For example, FIG. 6 discloses a Screw Feeder in which material exits axially from the screw. In the addition, by adding a TEE as shown in FIG. 7, material may be flowed with a screw then exits perpendicular from the screw.

Turning now to FIG. 8, the ArcWhirl® Straight Ram Feeder Press provides a solution for dewatering, drying and gasifying or pyrolyzing material in one single step. A filter which includes a TEE housing and a Porous Tube are attached to a conveyance means. As shown in FIG. 8 the conveyance means includes a Ram and a Hydraulic/Pneumatic Cylinder. It will be understood that the conveyance means may be a screw/flighting, a shaft, a gearbox with hollow drive shaft and a motor as shown in FIGS. 6 and 7, in lieu of the Ram and Hydraulic/Pneumatic Cylinder as shown in FIG. 8. Likewise, it will be understood that any type of filter press which includes a screw, auger, ram or applies hydraulic/pneumatic pressure, such as the Salsnes Filter and screw press auger (U.S. Pat. No. 6,942,786) may be used as the Filter Press of the present invention. The ICP ArcWhirl® can easily be retrofitted to a Salsnes Filter by referring to the '786 Patent's FIG. 4. The spring loaded lid 71 of the Salsnes Filter would be removed and the outlet pipe 70 of the Salsnes Filter would be coupled to the ICP ArcWhirl® Vortex Finder of the present invention's FIG. 4B. Quite simply the Salsnes Filter spring loaded lid 70 would simply be replaced with a means for direct coupling to the ICP ArcWhirl's® Vortex Finder Electrode.

There is a problem with the Salsnes Filter which is not disclosed in the '786 Patent nor disclosed in Salsnes literature, website or published information. When the filter was turned on and the blower energized a very strong odor was emitted from the ventilation pipe. Now referring back to the '786 Patent there is absolutely no disclosure of a ventilation pipe in contrast to the picture and animation shown on Salsnes Filter's website. Salsnes Filter Technical Paper #3, found at: http://www.salsnes.com/pdfs/TechnicalPaper_3.pdf clearly discloses a ventilation pipe 21 on the Figures located on page 6. The key lists 21 as ventilation. Herein lies the downfall and problem with the Salsnes Filter. The ventilation pipe is now considered a point source emission. A large air flow has been found to indeed be discharged from the ventilation pipe. This design, using a blowoff device to keep the filter belt clean, in combination with a point source ventilation pipe discharging the foul smelling into the air can be dramatically improved with the ArcWhirl® of the present invention.

The cake from the discharge of the Salsnes Filter or any filter press can be educted or ejected into the ICP ArcWhirl® by means of a venturi as shown in FIG. 4B. Any FLUID may be used as the motive jet fluid for operating the venturi. However, an ideal FLUID would be steam if operating in a steam plasma mode, or air if operating in a lean combustion mode. If air is used in a lean combustion mode, then the excess air could be used for aerating wastewater. This would allow for zero air emissions and zero disposal of biosolids. Thus, any wastewater treatment facility applying the present invention would show tremendous savings for both aeration and biosolids disposal costs. This will be clearly shown in Example 1.

EXAMPLE 1

Referring to FIGS. 4A and 4B the eductor/ejector as shown in FIG. 4B uses a waste air or waste gas stream discharged from a process stream, such as the ventilation pipe of the Salsnes Filter. Biosolids discharged from a filter press, such as the screw press of the Salsnes Filter are ejected into the ICP ArcWhirl® via the ejector venturi. When configured as shown in FIG. 4A, the plasma will exhaust via the top vortex finder 13. The carbonized biosolids or a full molten flow will be discharged thru the apex valve 12. The plasma plume may be further mixed with additional air for lean combustion. The stream can then be discharged directly into a wastewater aeration lagoon, thus eliminating a point source discharge.

In lieu of pneumatic conveying and in order to fully understand how material, such as carbonaceous material, could be pushed directly into an electrode nozzle the inventor of the present invention constructed an ArcWhirl® with Extra Electrode Stinger as shown in FIG. 9. Turning now to FIG. 9, the 1st electrode was a ⅞" diameter carbon arc gouging electrode. The 2nd Electrode Vortex Finder was machined with a 1½" internal diameter hole. Thus, the 1st electrode could not be dead shorted to the 2nd Electrode Vortex Finder in order to form an arc. Consequently, the inventor simply inserted another gouging electrode directly into the Vortex Finder and touched it to both the 1st and 2nd electrodes. The arc was established and the 3rd electrode stinger was pulled out of the 2nd Vortex Finder Electrode.

What occurred next was completely unexpected. The water flow to the ArcWhirl® was shut off and only air flowed into the ArcWhirl® hydryocyclone. A control valve was shut forcing all of the air through the carbon nozzle. The plasma did not extinguish. Contrary to all plasma torches which require a precise amount of gases in order to not "BLOW OUT" the arc, the ArcWhirl® will operate at any volume and pressure. Why? Simply because the BLUE ARC when viewed with a Number 11 welder's shield is centered between the carbon rods. The plasma simply blows over the carbon stinger rod. The carbon adds fuel to the air plasma.

When the stinger was placed back into the 2nd electrode nozzle, the plasma could not be extinguished regardless of how much fluid was flowed into the ArcWhirl®. This is due in part to the novel Vortex Finder Electrode design coupled with centering the arc with dual electrodes aligned on the central axis.

The carbon in the carbon electrodes in a plasma water treatment and plasma steam generator system adds energy, but can be captured if used for enhanced oil recovery. Since carbon sublimes, then it does not contaminate any downstream equipment when combined with air or steam.

Next the stinger was slowly pulled out until it was about one inch from the end of the carbon nozzle. The arc remained attached to the carbon stinger but looped back around to the carbon nozzle to complete the circuit. The carbon rod stinger was not attached nor grounded to a power supply. This gives rise to a unique configuration for transferring an arc. Likewise, it will be understood that the carbon stinger can be attached to a 2nd DC power supply to increase the plasma volume and density.

Turning to FIG. 10, an Electrode Stopper was machined with an outside diameter of 2" to precisely fit unto the 1st Electrode. The Electrode Stopper was machined in order to dead short the 1st electrode to the 2nd Electrode Vortex Finder. The purpose for this setup will be fully disclosed in The Research and Development Plasma ArcWhirl® System.

Referring to FIG. 11, an electric Meat Grinder was purchased then fitted with a 2"×1½" sanitary type reducer. Sanitary fittings were used to construct all of the parts for the ArcWhirl®. The reason for using Tri-Clover® Clamps and fittings, normally referred to as 3A Sanitary Clamps and Fittings, was to design a plasma system that could be rapidly assembled, disassembled, modified or changed with very few hand tools. This will be clearly shown in the following examples. Any type of clamping system that allows for rapid assembly or disassembly will suffice, thus not limiting the present invention to Sanitary Type Fittings and Clamps. For example, for constructing a heavy duty industrial R&D Plasma System the inventor anticipates using hammer union fittings commonly found in the oil and gas industry. The only tool needed for assembly and disassembly is a hammer.

The meat grinder was simply used as an auger or screw feeder. Sand was flowed into the meat grinder and then directly into the hot carbon nozzle. The sand exited the ArcWhirl® as glass particles into the tank. Next the inventor of the present invention obtained pressed biosolids from a local wastewater treatment facility. The biosolids were fed into the meat grinder then forced into the carbon nozzle.

Biosolids were continuously fed into the carbon nozzle via the meat grinder. The inventor carefully viewed the arc and plasma through the Full View Sight Glass and closely watched the water discharge into the tank. It appeared that nothing was being discharged with the water. So more biosolids were fed to the screw conveyor (meat grinder). Once again no solids were flowed out with the water. The volute housing the carbon nozzle became red hot in a local spot and began to melt. The system was shut down, taken apart and inspected for damage. A small carbon ball was sandwiched between the carbon nozzle and the inside of the volute. Likewise, a large carbon ball was stuck within the internal throat of the carbon nozzle. The carbon ball was removed then broken apart. A white small ball was located within the center of the carbon ball.

Not being bound by theory, what apparently occurred was that the biosolids were completely pyrolyzed which formed a solid carbon compound with a minerals matrix centered within the carbon ball. Thus, this gives rise to a means for capturing carbon from any carbonaceous feedstock. Likewise, this gives rise to a means for treating solid material such as coke, coal, drill cuttings, tailings, tank bottoms, proppants and upgrading and/or gasifying viscous materials such as oil sand bitumen, oil shale kerogen and beach sand or solids covered with crude oil from oil spills.

Submerged Gasification and Combustion

Referring to FIG. 11, the ArcWhirl® coupled with a screw conveyor can be used as a novel submerged combustor. Any fluid that needs to be heated is flowed in the Inline Annular Air Ejector as shown by Arrow A and into the Fluid Inlet of the 1st Volute/Scroll. Compressed Air or Oxygen is flowed into the Ejector and mixed with the Fluid. When an arc is established a carbonaceous fuel source is charged to the screw feeder as shown by Arrow G. The Screw Feeder conveys the material directly through the 2nd Electrode Vortex Finder. The material will be gasified and partially oxidized. When the syngas reaches the Air or Oxygen plasma it will be fully combusted. The hot gases and partially heated fluid exit the 2nd Volute/Scroll and into an effluent storage tank. When thoroughly mixed within the tank, the hot gases thoroughly heat the fluid for maximizing heat transfer. It will be understood that this device can be installed within a tank or hung on the side of a tank or made as an integral part of a vessel, reactor, reboiler or column. In addition, this device can be installed downhole in oil and gas wells, for example for In Situ generation of steam and hot gases for SAGD facilities. This submerged plasma combustor can heat any fluid with any carbonaceous material, whether solid, liquid or gas. In addition, by placing the ignition source, the plasma arc, directly in the center of the whirling fluid, this will ensure that the combustion flame stays lit. The present invention as shown in FIGS. 1 thru 24 can be configured to operate as a Submerged Gasifier and/or Submerged Gasifier.

Turning to FIG. 12, a 1½" diameter sanitary TEE was placed between the Meat Grinder Screw Feeder and the ArcWhirl® 2nd Electrode Vortex Finder. The TEE was installed to determine how far the plasma would discharge into the TEE and how close it would come to touching the auger or screw within the Meat Grinder. As shown in FIG. 12 the Plasma flowed in both directions inside the TEE. In fact, a red Hot Spot was rapidly formed on the backside of the TEE. The ArcWhirl® was shutdown so as to not melt the TEE.

Once again using quick clamps, The Plasma ArcWhirl® System was reconfigured as shown in FIG. 13. A stainless steel Cyclone Separator was attached to the TEE. The Meat Grinder was moved to the position as shown in FIG. 13. Various materials were augered into the Plasma which was injected into the Cyclone Separator forming a Whirling Plasma. When viewed by looking down and into the outlet a Whirling Plasma was clearly noticeable in the Cyclone Separator. It is this configuration when operated with three or more ArcWhirl® torches that are tangentially aligned to each other which gives rise to the patented Plasma Whirl® Reactor (U.S. Pat. No. 7,622,693).

For example, by using Plasma ArcWhirl® System with only one torch, a potential end user such as an Oil Sands Company could easily produce data that would allow scaling up using high power ArcWhirl® Torches configured as shown in FIG. 1 of the Plasma Whirl® Reactor Patent '693.

Referring to FIGS. 13 and 14 of the present invention, the Cyclone Separator was disconnected and reassembled as a 3rd Volute/Scroll. This configuration would be commonly referred to as an inline Cyclone Separator. A 4th Volute was added and next the NEW screw feeder as previously disclosed in FIG. 6 is connected as shown in FIG. 14. This configuration as shown in FIG. 14 now allows for straight feeding material directly into the plasma plume, but falling short of being pushed into the 2nd Electrode Vortex Finder. Both the gases and solid material from the carbonaceous matter enters into the 3rd Volute/Scroll. The solids exit via a Material Outlet in the direction as shown by Arrow E. Hot gases enter into the 4th Volute/Scroll and exit as shown by Arrow F and may be flowed to a gas cleanup process.

FIG. 15 now discloses the IC Plasma ArcWhirl® with Dual Electrodes and a TEE Side Screw Press. The Straight Screw Feeder is now relocated to a TEE but includes a filter in order to be operated as a screw press. An RF Coil Spool Assembly is positioned in order to couple to the plasma discharged from the 2nd Electrode Nozzle thru the 4×4 TEE and into the 4th Scroll. Material to be dewatered, dried and then gasified is flowed into the screw press as shown by Feed In Arrow G. A fluid outlet on the screw press allows for water to flow out of the pressed solids. It will be understood that the 1st Actuator and the 2nd Actuator are designed with a means to continuously feed the electrodes into the Plasma ArcWhirl®. Carbon or Graphite Rods have female and male threaded ends in order to couple together. This allows for 24/7 365 days a year of operation. It is this difference and configuration that separates the IC Plasma ArcWhirl® from all other plasma designs—a means for continuously feeding an RF susceptor/electrode into an ICP Torch.

Referring to FIGS. 7 and 16, the ArcWhirl® TEE Screw Feeder is now configured and attached to the ArcWhirl® Dual Electrodes RF Coil TEE Feeder as shown in FIG. 16. This simply gives Engineers, Developers, Scientists and plasma technicians another mode for feeding carbonaceous material or any material into the IC Plasma ArcWhirl®. Once again this Plasma R&D Tool is easily configured and reconfigured in order to operate in various modes.

Referring to FIG. 17, material is fed via a 3rd dual entry Volute/Scroll. This configuration allows material to be hydraulically or pneumatically conveyed directly into the Inductively Coupled Plasma. Once again a different mode to conduct plasma R&D.

Scaling Up the R&D ICP ArcWhirl® System

FIGS. 18, 19, 20, 21 and 22 demonstrate how the ICP ArcWhirl® System can be scaled up using off-the-shelf or commonly available equipment. FIG. 18 discloses coupling a Concrete Pump to a Filter Screen which is coupled to the ICP ArcWhirl®. This configuration would work well in the Upstream Oil & Gas Industry.

Developers for Haynesville Shale Gas and Marcellus Shale Gas Developers have yet to solve the drill cuttings disposal problem as well as the frac flowback problem. As disclosed in FIG. 18 drill cuttings are fed directly into a Concrete Pump. The Concrete Pump conveys the drill cuttings to the IC ArcWhirl® which includes a filter screen close coupled to the Electrode Nozzle. Fluids are pressed out of the cuttings for reuse or pumped back to the ENTRY of the Concrete Pump. Once the drill cuttings are melted and converted to a slag, the slag is dumped into a quench tank. The quench tank consists of frac flowback water. The molten slag provides the heat necessary for flash evaporating the frac flowback water. Although not illustrated in FIG. 18, the frac flowback may be the quench fluid flowing as shown in FIG. 19.

Another ideal upstream Oil & Gas stream that can be treated with the ICP ArcWhirl® is oil sand and its waste streams. If applied directly after the crushers in an Oil Sand Pit Mining Operation, the IC Plasma ArcWhirl® is GAME CHANGING. Quite simply it eliminates the use of water. This non-aqueous process revolutionizes the production of a high quality bitumen by taking everything to a full melt. This allows for recovery of tailings by dumping the tailings directly into the molten slag from the virgin oil sands. This also allows for production of metals plus a slag of high value for road construction.

SAGD operations are in dire need of an all electric water treatment, steam generation and gasification system. Progressive cavity pumps are now commonly used in heavy oil applications.

Referring to FIG. 19—IC Plasma ArcWhirl® Hybrid Progressive Cavity Pump, bitumen from the primary separator of a SAGD facility is fed into the Progressive Cavity Pump. High pressure low quality steam of about 85% steam and 15% moisture is flowed into the ICP ArcWhirl® as shown by Arrow A. The RF Coil couples to the electrodes and the steam plasma. The steam plasma flows thru the Electrode Nozzle and directly contacts the bitumen in a countercurrent flow. The syngas produced from steam plasma reforming the bitumen exits via a Material Outlet as shown by Arrow E.

The steam exiting from the 2nd Volute/Scroll in the direction of Arrow B is superheated and of a higher quality then current HRSG's and boilers. This is an all electric superheater and gasifier combined in one package. Of course the superheated steam will be flowed down the injector well for heating up and recovering more bitumen. The steam was produced with the HiTemper™ system which is incorporated in its entirety. In addition, current SAGD operations have very large lime ponds. Thus, by using one IC ArcWhirl® to reclaim the lime, a tremendous amount of steam and $CO_2$ can be produced by calcining the spent lime for generating superheated steam and $CO_2$ in the IC Plasma ArcWhirl® Hybrid Progressive Cavity Pump Gasifier.

The calcined lime is slaked into the bitumen for two reasons. First, the lime is an electrolyte and will aid in coupling the plasma to the bitumen. Next, the CaO will combine with contaminants to aid in hot gas scrubbing of the syngas. The syngas can then replace fuel gas for use in combustion turbines, boilers and HRSGs. Thus, this eliminates the problem of burning clean natural gas to produce dirty oil.

Now referring to FIG. 20, another means for feeding and pressing material is disclosed by attaching an Extruder as disclosed in U.S. Pat. No. 6,790,023 to a porous tube. This configuration clearly demonstrates another means for conveying material into a DUAL IC Plasma ArcWhirl®. The dual RF Coils ensure that all solid materials are melted and/or treated, thus allowing for treatment of hazardous waste material.

At the heart of Scaling up the present invention is a novel IC Plasma ArcWhirl® Screw Press as disclosed in FIG. 21. Screw presses are commonly available. Likewise, screw presses with a hollow shaft and hollow gearbox pinion gear are available from Press Technology & Mfg., Inc., 1401 Fotler St., Springfield, Ohio 45504. The RF Coil with Susceptor may be constructed from any electrically conductive material. However, an ideal material is Tungsten Carbide. As shown in FIG. 21, dual electrodes are continuous fed into the IC Plasma ArcWhirl®. This ensures that a plasma will be maintained at all times. The RF Coil will couple to the susceptor, thus heating the susceptor. Although not illustrated a second coil may be added between the dual entry volute and the larger scroll.

There exists a need for pretreating material prior to injection into an incinerator. One of the largest incinerators in the U.S. is located in Port Arthur, Tex. and is operated by Veolia. The incinerator is fed with a hydraulic ram feeder pushing hazardous waste down a long sweeping 8" diameter pipe. A steam lance had to be added to the end of the pipe that extends into the incinerator in order to fluidize the material. The present invention disclosed in FIG. 22, would completely replace the steam injector and would dramatically enhance throughput. Likewise, this system could be attached to any Medical Waste Incinerator to increase throughput and eliminate natural gas usage.

Referring to FIG. 22, material enters into the feed inlet of the Ram Feeder Press. A hydraulic or pneumatic cylinder cycles and applies axial thrust to the Ram. The Ram pushed feed material into a Porous Tube Module. Fluids exit via a Fluid Outlet. Material begins to dry, pyrolize and gasify within the porous tube. The Ram is cycled in order to continuously push material into the RF Coil Susceptor Nozzle. The Large Diameter Continuous Feed Electrode is of a larger diameter than the hole within the RF Coil Susceptor Nozzle. The electrode provides two functions. First, the ArcWhirl® is started in a dead short by touching the electrode the RF Coil Susceptor. Once the arc is formed a plasma will form shortly thereafter.

The second function is a function that has provided unexpected results. The tapered electrode acts as a physical valve and an electrical valve in order to provide back pressure to the solids. The physical valve is easy to understand since most screw presses or hydraulic filter presses includes a means for holding back solids. However, not being bound by theory, it is believed that when biosolids were forced into the ArcWhirl® and formed a carbon ball, the carbon ball acted as a conductor in a solenoid thus wanting to travel in the direction of the plasma. Yet, the mechanical screw meat grinder feeder counteracted the electromotive force.

Referring to FIGS. 23, 24 and 25, the IC Plasma ArcWhirl® Hybrid is shown with the RF coil in various locations. Once again, utilizing quick clamping techniques known in the art, a Plasma R&D Tool Kit can be constructed from off-the-shelf components for conducting high quality R&D with plasma. FIGS. 1 thru 25 clearly demonstrate a system, method and apparatus for a Plasma R&D Tool Kit, that allows for rapid scaling up.

Electrolytes and Polyelectrolytes

It is well known and well understood that water treatment requires the addition of electrolytes. For example, one of the oldest methods for treating water is cold lime softening. Lime is an electrolyte. Likewise, lime is added to pressed sludge in order to treat it by means of heat and pH adjustment. Prior to pressing sludge with a filter press, operators typically add a polyelectrolyte.

The addition of a natural electrolyte or manufactured electrolyte, such as BASF/CIBA's new bead technology, for example Zetag® 7593, to the material to be pressed within the Plasma ArcWhirl® Screw Press will dramatically enhance its performance. Not being bound by theory it is believed that the electrical arc, plasma and the RF Field may couple to the electrolytes within the biosolids, sludge, etc. Thus, this will allow for rapid heating via electrical conduction and joule heating directly within the biosolids, sludge, bitumen, oil/water or water/oil emulsion or any material that contains ions or that may become electrically conductive, such as biochar and/or activated carbon.

Biochar and Carbon Capture

The present invention produces biochar from biomass by flowing it into the plasma via the screw conveyor. Volatiles will gas off leaving behind char. Likewise, if steam is added and forms a steam plasma, then volatiles from carbonaceous material may be gasified and the $CO_2$ can be captured and stored. This can easily be demonstrated in one of the configurations as disclosed in FIGS. 1 through 24. The ideal and most economical configuration will be based upon feed material(s) testing in various configurations of the R&D Plasma ArcWhirl® System.

The foregoing description of the apparatus and methods of the invention in preferred and alternative embodiments and variations, and the foregoing examples of processes for which the invention may be beneficially used, are intended to be illustrative and not for purpose of limitation. The invention is susceptible to still further variations and alternative embodiments within the full scope of the invention, recited in the following claims.

What is claimed is:

1. A plasma treatment system comprising:
   a plasma arc torch comprising:
      a cylindrical vessel having a first end and a second end,
      a first tangential inlet/outlet connected to or proximate to the first end,
      a second tangential inlet/outlet connected to or proximate to the second end,
      an electrode housing connected to the first end of the cylindrical vessel such that a first electrode is (a) aligned with a longitudinal axis of the cylindrical vessel, and (b) extends into the cylindrical vessel, and
      a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel;
   a tee attached to the hollow electrode nozzle; and
   a screw feed unit or a ram feed unit having an inlet and an outlet attached to the tee.

2. The plasma treatment system as recited in claim 1, further comprising a radio frequency coil disposed around or embedded within the cylindrical housing.

3. The plasma treatment system as recited in claim 1, further comprising an electrode stopper disposed within the cylindrical vessel.

4. The plasma treatment system as recited in claim 1, further comprising a porous tube disposed within the tee and aligned with the centerline.

5. The plasma treatment system as recited in claim 1, further comprising a stinger electrode extending from the screw feed unit or the ram feed unit and either aligned or canted with the centerline of the hollow electrode nozzle.

6. The plasma treatment system as recited in claim 1, wherein the outlet of the screw feed unit or the ram feed unit is aligned with the centerline or perpendicular to the centerline.

7. The plasma treatment system as recited in claim 1, further comprising:
   the outlet of the screw feed unit or the ram feed unit is aligned perpendicular to the centerline; and
   a cyclone separator connected to the tee and having a tangential inlet aligned with the centerline.

8. The plasma treatment system as recited in claim 1, further comprising a volute connected between the tee and the hollow electrode nozzle.

9. The plasma treatment system as recited in claim 1, further comprising:

a cylindrical tube connected between the tee and the hollow electrode nozzle; and a radio frequency coil disposed around or embedded within the cylindrical tube.

10. The plasma treatment system as recited in claim 1, further comprising a gas source attached to the first tangential inlet/outlet of the plasma arc torch.

11. The plasma treatment system as recited in claim 1, further comprising a pump or conveyor connected to the inlet of the screw feed unit.

12. The plasma treatment system as recited in claim 1, further comprising a processor or separator connected to the output of the screw feed unit.

13. The plasma treatment system as recited in claim 1, further comprising a valve connected to the second tangential inlet/outlet of the plasma arc torch.

14. The multi-mode plasma arc torch as recited in claim 1, further comprising a linear actuator operably connected to the first electrode to adjust the position of the first electrode with respect to the hollow electrode nozzle.

15. The multi-mode plasma arc torch as recited in claim 1, further comprising a power supply electrically connected to the first electrode and the hollow electrode nozzle.

* * * * *